United States Patent
Binkai et al.

(10) Patent No.: US 11,876,554 B2
(45) Date of Patent: Jan. 16, 2024

(54) OPTICAL TRANSCEIVER, TRANSMISSION SIGNAL DETERMINATION METHOD, AND OPTICAL COMMUNICATION SYSTEM

(71) Applicant: Mitsubishi Electric Corporation, Tokyo (JP)

(72) Inventors: Masashi Binkai, Tokyo (JP); Tsuyoshi Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 13 days.

(21) Appl. No.: 17/865,164

(22) Filed: Jul. 14, 2022

(65) Prior Publication Data

US 2022/0352979 A1  Nov. 3, 2022

Related U.S. Application Data

(63) Continuation of application No. PCT/JP2020/039632, filed on Oct. 21, 2020.

(30) Foreign Application Priority Data

Mar. 2, 2020 (WO) .................. PCT/JP2020/008592

(51) Int. Cl.
*H04B 10/00* (2013.01)
*H04B 10/077* (2013.01)
(Continued)

(52) U.S. Cl.
CPC ....... *H04B 10/077* (2013.01); *H04B 10/0731* (2013.01); *H04B 10/43* (2013.01); *H04B 10/50* (2013.01); *H04J 14/02* (2013.01)

(58) Field of Classification Search
CPC .......................... H04B 10/077; H04B 10/0775
See application file for complete search history.

(56) References Cited

U.S. PATENT DOCUMENTS

2016/0003993 A1\* 1/2016 Matsushita ............ G02B 5/284
359/578
2017/0214461 A1 7/2017 Yamauchi et al.
(Continued)

FOREIGN PATENT DOCUMENTS

JP  2017-135455 A  8/2017
JP  2019-114823 A  7/2019
(Continued)

*Primary Examiner* — Daniel G Dobson
(74) *Attorney, Agent, or Firm* — Birch, Stewart, Kolasch & Birch, LLP

(57) ABSTRACT

An optical transceiver includes processing circuitry to calculate, when test signals are sent to a transmission line from a transmitter and a receiver receives the test signals having passed through a wavelength filter, a bandwidth of the received test signals, the transmitter generating, as the test signals, a collection of narrowband signals, the narrowband signals having a narrower bandwidth than a bandwidth of the wavelength filter and having different frequencies, and the wavelength filter included in an optical splitter inserted in the transmission line, and the collection of narrowband signals including a narrowband signal having a higher frequency than a highest frequency in the bandwidth of the wavelength filter and a narrowband signal having a lower frequency than a lowest frequency in the bandwidth of the wavelength filter, and to determine a modulation rate and a modulation level of the transmission signal depending on the calculated bandwidth.

13 Claims, 15 Drawing Sheets

(51) Int. Cl.
*H04B 10/073* (2013.01)
*H04B 10/43* (2013.01)
*H04B 10/50* (2013.01)
*H04J 14/02* (2006.01)
*H04J 14/00* (2006.01)

(56) References Cited

U.S. PATENT DOCUMENTS

2018/0316438 A1    11/2018  Kodama et al.
2019/0222312 A1*   7/2019   Moeller ............. H04B 10/0775
2019/0288775 A1    9/2019   Maeda

FOREIGN PATENT DOCUMENTS

| JP | 2019-161448 A | 9/2019 |
| WO | WO 2017/149668 A1 | 9/2017 |
| WO | WO 2017/163993 A1 | 9/2017 |

* cited by examiner

US 11,876,554 B2

OPTICAL TRANSCEIVER, TRANSMISSION SIGNAL DETERMINATION METHOD, AND OPTICAL COMMUNICATION SYSTEM

CROSS REFERENCE TO RELATED APPLICATIONS

This application is a Continuation of PCT International Application No. PCT/JP2020/039632, filed on Oct. 21, 2020, which claims priority under 35 U.S.C. 119(a) to Patent Application No. PCT/JP2020/008592, filed in Japan on Mar. 2, 2020, all of which are hereby expressly incorporated by reference into the present application.

TECHNICAL FIELD

The present disclosure relates to an optical transceiver, a transmission signal determination method, and an optical communication system including optical transceivers.

BACKGROUND ART

With an increase in demand for communication, it is desired to increase the transmission capacity of an optical communication network.

The transmission capacity of an optical communication network increases by increasing a baud rate which is the modulation rate of an optical signal. In addition, the transmission capacity of the optical communication network increases by increasing the modulation level of the optical signal. The modulation level of the optical signal corresponds to entropy which is an upper limit to the amount of information that can be transmitted by the optical signal. In a case of a constant transmission capacity, there is a trade-off relationship between the baud rate and entropy.

A plurality of optical splitters is inserted in a transmission line of an optical communication network. Each of the optical splitters includes therein a wavelength filter. The optical splitter switches a distribution destination of an optical signal using the wavelength filter. When the bandwidth of an optical signal is wider than the bandwidth of the wavelength filter, upon passage of the optical signal through the wavelength filter, the bandwidth of the optical signal is narrowed to the same bandwidth as the bandwidth of the wavelength filter.

The following Patent Literature 1 discloses a network design apparatus that calculates, on the basis of the number of wavelength filters (hereinafter, referred to as "pass filters") included in one or more optical splitters through which an optical signal passes among a plurality of optical splitters inserted in a transmission line, a bandwidth of the optical signal having passed through all pass filters. The network design apparatus determines, on the basis of the bandwidth of the optical signal having passed through all pass filters, a combination of the baud rate of the optical signal and the entropy of the optical signal.

CITATION LIST

Patent Literatures

Patent Literature 1: JP 2019-161448 A

SUMMARY OF INVENTION

Technical Problem

Depending on the network configuration of an optical communication network, all pass filters may have the same bandwidth or the pass filters may have different bandwidths. Thus, when the network design apparatus calculates a bandwidth of an optical signal having passed through all pass filters only on the basis of the number of the pass filters, the calculated bandwidth is not always an accurate bandwidth. If an accurate bandwidth of the optical signal cannot be calculated, then the network design apparatus cannot determine a proper combination of the baud rate of the optical signal and the entropy of the optical signal, and thus, there is a problem that the transmission capacity of the optical communication network may not be able to be increased.

The present disclosure is made to solve the above problem, and an object of the present disclosure is to obtain an optical transceiver and a transmission signal determination method that can increase the transmission capacity of an optical communication network over one that calculates, on the basis of the number of pass filters, a bandwidth of an optical signal having passed through all pass filters.

Solution to Problem

An optical transceiver according to the present disclosure includes processing circuitry to calculate, when test signals are sent to a transmission line of an optical communication network from a test signal transmitter and a test signal receiver receives the test signals having passed through a wavelength filter, a bandwidth of the test signals received by the test signal receiver, the test signal transmitter generating, as the test signals, a collection of narrowband signals, the narrowband signals being a plurality of signals having a narrower bandwidth than a bandwidth of the wavelength filter and having different frequencies, and the wavelength filter being included in an optical splitter inserted in the transmission line, and the collection of narrowband signals including a narrowband signal having a higher frequency than a highest frequency in the bandwidth of the wavelength filter and a narrowband signal having a lower frequency than a lowest frequency in the bandwidth of the wavelength filter, and to perform determination of a modulation rate of a transmission signal and a modulation level of the transmission signal depending on the bandwidth.

Advantageous Effects of Invention

According to the present disclosure, the transmission capacity of an optical communication network can be increased over one that calculates, on the basis of the number of pass filters, a bandwidth of an optical signal having passed through all pass filters.

BRIEF DESCRIPTION OF DRAWINGS

FIG. 4 is a hardware configuration diagram of a computer in a case where components of the digital processing unit 10 are implemented by software, firmware, or the like.

FIG. 8 is an explanatory diagram showing a bandwidth $W_{L-H}$ of test signals having passed through wavelength filters 6-1a and 6-2a.

DESCRIPTION OF EMBODIMENTS

To describe the present disclosure in more detail, embodiments for carrying out the present disclosure will be described below with reference to the accompanying drawings.

First Embodiment

Figure 1:
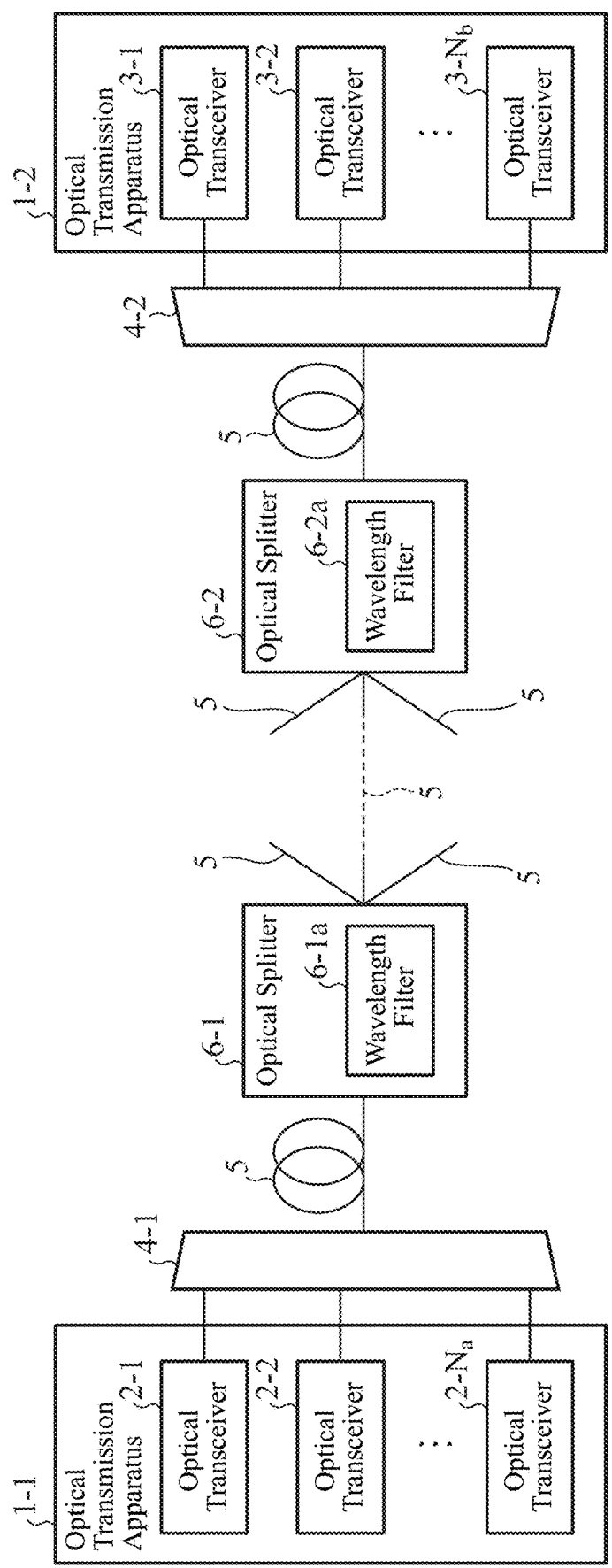
FIG. 1 is a configuration diagram showing an optical communication system according to a first embodiment.

FIG. 1 is a configuration diagram showing an optical communication system according to a first embodiment.

The optical communication system includes M optical transmission apparatuses 1. M is an integer equal to or greater than 2.

In FIG. 1, for simplicity of description, there is shown an example in which the optical communication system includes two optical transmission apparatuses 1, and one optical transmission apparatus 1 is represented by an optical transmission apparatus 1-1, and the other optical transmission apparatus 1 is represented by an optical transmission apparatus 1-2.

The optical communication system forms an optical communication network.

The optical communication system includes the optical transmission apparatuses 1-1 and 1-2, multiplexers 4-1 and 4-2, transmission lines 5, and optical splitters 6-1 and 6-2.

The optical transmission apparatus 1-1 includes $N_a$ optical transceivers 2-1 to 2-$N_a$. $N_a$ is an integer equal to or greater than 1.

The optical transmission apparatus 1-2 includes $N_b$ optical transceivers 3-1 to 3-$N_b$. $N_b$ is an integer equal to or greater than 1.

An optical transceiver 2-$n_a$ ($n_a$=1, . . . , $N_a$) is a first optical transceiver.

The optical transceiver 2-$n_a$ transmits an optical signal which is a transmission signal to an optical transceiver 3-$n_b$ ($n_b$=1, . . . , $N_b$) through the transmission lines 5 or the like.

In addition, the optical transceiver 2-$n_a$ receives an optical signal transmitted from the optical transceiver 3-$n_b$.

The optical transceiver 3-$n_b$ is a second optical transceiver.

The optical transceiver 3-$n_b$ transmits an optical signal which is a transmission signal to the optical transceiver 2-$n_a$ through the transmission lines 5 or the like.

In addition, the optical transceiver 3-$n_b$ receives an optical signal transmitted from the optical transceiver 2-$n_a$.

The optical transceiver 2-$n_a$ and the optical transceiver 3-$n_b$ have the same configuration. Thus, the optical transceiver 3-$n_b$ may be a first optical transceiver and the optical transceiver 2-$n_a$ may be a second optical transceiver.

When an optical signal is transmitted from an optical transceiver 2 which is any one of the $N_a$ optical transceivers 2-1 to 2-$N_a$ to the multiplexer 4-1, the multiplexer 4-1 outputs the optical signal to the transmission line 5.

When the multiplexer 4-1 receives an optical signal transmitted through the transmission lines 5, the multiplexer 4-1 outputs the optical signal to an optical transceiver 2 which is any one of the $N_a$ optical transceivers 2-1 to 2-$N_a$.

When an optical signal is transmitted from an optical transceiver 3 which is any one of the $N_b$ optical transceivers 3-1 to 3-$N_b$ to the multiplexer 4-2, the multiplexer 4-2 outputs the optical signal to the transmission line 5.

When the multiplexer 4-2 receives an optical signal transmitted through the transmission lines 5, the multiplexer 4-2 outputs the optical signal to an optical transceiver 3 which is any one of the $N_b$ optical transceivers 3-1 to 3-$N_b$.

The transmission lines 5 are implemented by, for example, optical fibers.

The optical communication system shown in FIG. 1 includes the plurality of transmission lines 5. Of the plurality of transmission lines 5, a transmission line 5 connects the multiplexer 4-1 to the optical splitter 6-1. In addition, another transmission line 5 connects the optical splitter 6-2 to the multiplexer 4-2.

The optical splitter 6-1 is inserted in the transmission line 5.

The optical splitter 6-1 includes a wavelength filter 6-1a that switches a distribution destination of an optical signal transmitted from the optical transceiver 2-$n_a$, on the basis of the wavelength of the optical signal.

When the wavelength of the optical signal transmitted from the optical transceiver 2-$n_a$ is a wavelength corresponding to the optical transceiver 3-$n_b$, the optical splitter 6-1 outputs the optical signal toward the optical transceiver 3-$n_b$.

When the wavelength of the optical signal transmitted from the optical transceiver $2\text{-}n_a$ is a wavelength corresponding to an optical transceiver (not shown) other than the optical transceiver $3\text{-}n_b$, the optical splitter 6-1 outputs the optical signal toward the optical transceiver (not shown) other than the optical transceiver $3\text{-}n_b$.

The optical splitter 6-2 is inserted in the transmission line 5.

The optical splitter 6-2 includes a wavelength filter 6-2a that switches a distribution destination of an optical signal transmitted from the optical transceiver $3\text{-}n_b$, on the basis of the wavelength of the optical signal.

When the wavelength of the optical signal transmitted from the optical transceiver $3\text{-}n_b$ is a wavelength corresponding to the optical transceiver $2\text{-}n_a$, the optical splitter 6-2 outputs the optical signal toward the optical transceiver $2\text{-}n_a$.

When the wavelength of the optical signal transmitted from the optical transceiver $3\text{-}n_b$ is a wavelength corresponding to an optical transceiver (not shown) other than the optical transceiver $2\text{-}n_a$, the optical splitter 6-2 outputs the optical signal toward the optical transceiver (not shown) other than the optical transceiver $2\text{-}n_a$.

Figure 2:
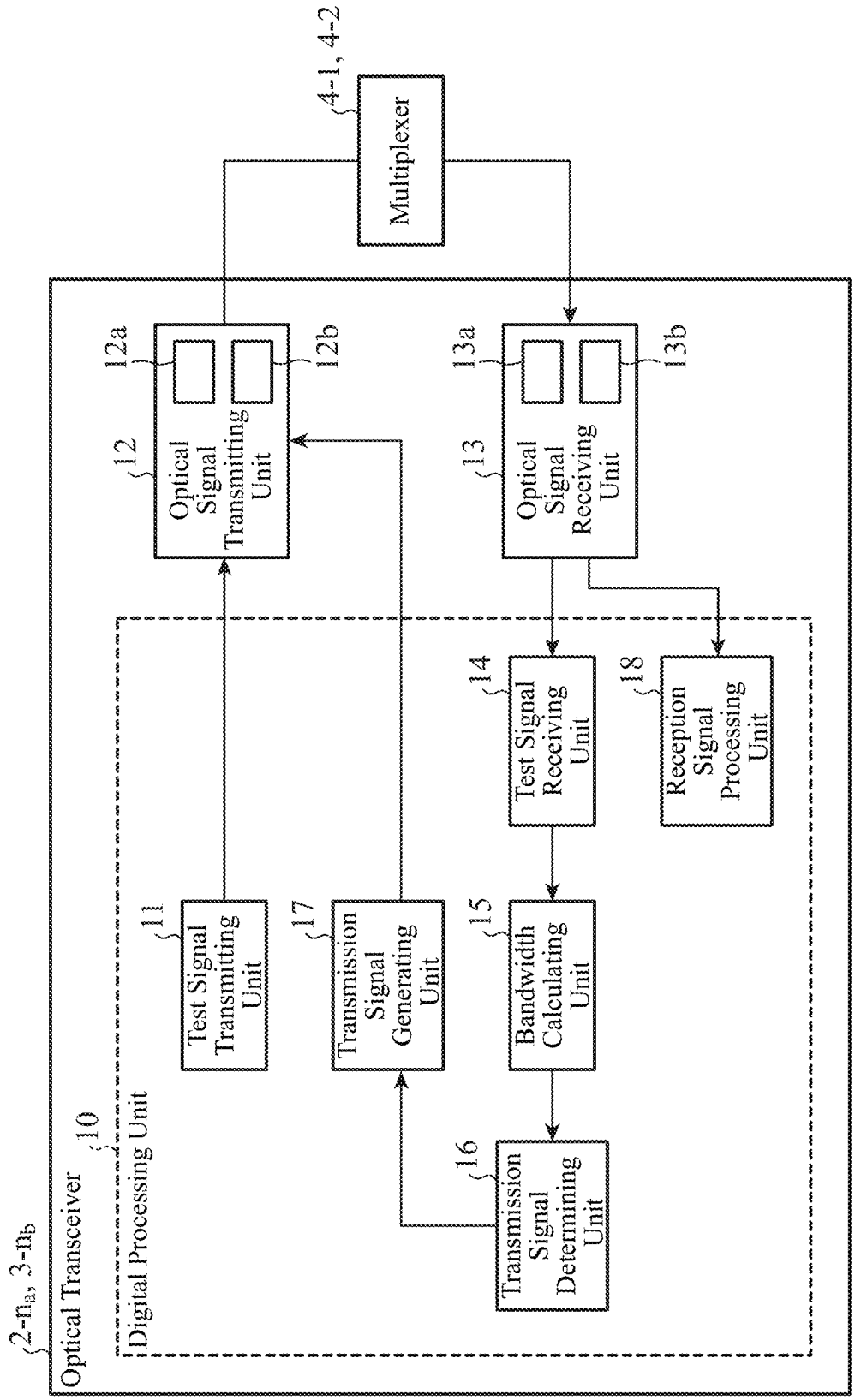
FIG. 2 is a configuration diagram showing optical transceivers 2-$n_a$ and 3-$n_b$ according to the first embodiment.

FIG. 2 is a configuration diagram showing the optical transceivers $2\text{-}n_a$ and $3\text{-}n_b$ according to the first embodiment.

Figure 3:
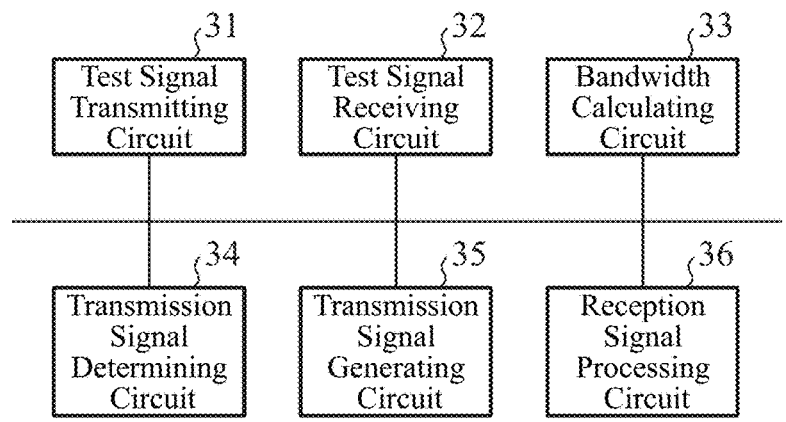
FIG. 3 is a hardware configuration diagram showing hardware of a digital processing unit 10.

FIG. 3 is a hardware configuration diagram showing hardware of a digital processing unit 10.

In FIG. 2, the digital processing unit 10 includes a test signal transmitting unit 11, a test signal receiving unit 14, a bandwidth calculating unit 15, a transmission signal determining unit 16, a transmission signal generating unit 17, and a reception signal processing unit 18.

The test signal transmitting unit 11 is implemented by, for example, a test signal transmitting circuit 31 shown in FIG. 3.

The test signal transmitting unit 11 generates, as test signals, a collection of narrowband signals which are a plurality of signals having a narrower bandwidth than the bandwidth of the wavelength filters 6-1a and 6-2a and having different frequencies. Here, for convenience of description, it is assumed that wavelength filters through which the test signals pass are the wavelength filters 6-1a and 6-2a. The narrowband signals are, for example, polarization-multiplexed signals.

The test signal transmitting unit 11 sends the test signals which are a collection of a plurality of narrowband signals to the transmission line 5 through an optical signal transmitting unit 12 or the like, which will be described later.

The optical signal transmitting unit 12 includes an electrical-to-optical converter 12a that converts the test signals outputted from the test signal transmitting unit 11 from electrical signals to optical signals, and outputs the optical signals; and an optical transmitter 12b that outputs the optical signals outputted from the electrical-to-optical converter 12a to a multiplexer 4.

The optical signal transmitting unit 12 in the optical transceiver $2\text{-}n_a$ outputs optical signals which are test signals to the multiplexer 4-1, and the optical signal transmitting unit 12 in the optical transceiver $3\text{-}n_b$ outputs optical signals which are test signals to the multiplexer 4-2.

The test signals outputted from the optical signal transmitting unit 12 in the optical transceiver $2\text{-}n_a$ are transmitted to the optical transceiver $3\text{-}n_b$ through the multiplexer 4-1, the transmission line 5, the wavelength filter 6-1a in the optical splitter 6-1, the transmission line 5, the wavelength filter 6-2a in the optical splitter 6-2, the transmission line 5, and the multiplexer 4-2.

The test signals outputted from the optical signal transmitting unit 12 in the optical transceiver $3\text{-}n_b$ are transmitted to the optical transceiver $2\text{-}n_a$ through the multiplexer 4-2, the transmission line 5, the wavelength filter 6-2a in the optical splitter 6-2, the transmission line 5, the wavelength filter 6-1a in the optical splitter 6-1, the transmission line 5, and the multiplexer 4-1.

An optical signal receiving unit 13 in the optical transceiver $2\text{-}n_a$ includes an optical receiver 13a that receives test signals having been outputted from the optical signal transmitting unit 12 in the optical transceiver $3\text{-}n_b$ to the multiplexer 4-2 and then having passed through the wavelength filters 6-2a and 6-1a. In addition, when a transmission signal is outputted as an optical signal from the optical signal transmitting unit 12 in the optical transceiver $3\text{-}n_b$ to the multiplexer 4-2, the optical receiver 13a receives, as a reception signal, the optical signal having passed through the wavelength filters 6-2a and 6-1a.

The optical signal receiving unit 13 in the optical transceiver $2\text{-}n_a$ includes an optical-to-electrical converter 13b that converts the test signals received by the optical receiver 13a from optical signals to electrical signals, and outputs the electrical signals to the test signal receiving unit 14 in the optical transceiver $2\text{-}n_a$. When a reception signal is received by the optical receiver 13a, the optical-to-electrical converter 13b converts the reception signal from an optical signal to an electrical signal, and outputs the electrical signal to the reception signal processing unit 18 in the optical transceiver $2\text{-}n_a$.

An optical signal receiving unit 13 in the optical transceiver $3\text{-}n_b$ includes an optical receiver 13a that receives test signals having been outputted from the optical signal transmitting unit 12 in the optical transceiver $2\text{-}n_a$ to the multiplexer 4-1 and then having passed through the wavelength filters 6-1a and 6-2a. In addition, when a transmission signal is outputted as an optical signal from the optical signal transmitting unit 12 in the optical transceiver $2\text{-}n_a$ to the multiplexer 4-1, the optical receiver 13a receives, as a reception signal, the optical signal having passed through the wavelength filters 6-1a and 6-2a.

The optical signal receiving unit 13 in the optical transceiver $3\text{-}n_b$ includes an optical-to-electrical converter 13b that converts the test signals received by the optical receiver 13a from optical signals to electrical signals, and outputs the electrical signals to the test signal receiving unit 14 in the optical transceiver $3\text{-}n_b$. When a reception signal is received by the optical receiver 13a, the optical-to-electrical converter 13b converts the reception signal from an optical signal to an electrical signal, and outputs the electrical signal to the reception signal processing unit 18 in the optical transceiver $3\text{-}n_b$.

The test signal receiving unit 14 is implemented by, for example, a test signal receiving circuit 32 shown in FIG. 3.

The test signal receiving unit 14 performs a reception process on the test signals which are the electrical signals outputted from the optical-to-electrical converter 13b in the optical signal receiving unit 13, thereby demodulating the test signals, and outputs the demodulated test signals to the bandwidth calculating unit 15.

The bandwidth calculating unit 15 is implemented by, for example, a bandwidth calculating circuit 33 shown in FIG. 3.

The bandwidth calculating unit 15 calculates a bandwidth of the test signals having passed through the wavelength filters 6-1a and 6-2a from the test signals received by the test signal receiving unit 14.

The bandwidth calculating unit 15 outputs bandwidth information indicating the calculated bandwidth of the test signals to the transmission signal determining unit 16.

The transmission signal determining unit 16 is implemented by, for example, a transmission signal determining circuit 34 shown in FIG. 3.

The transmission signal determining unit 16 determines a modulation level of a transmission signal and a modulation rate of the transmission signal depending on the bandwidth calculated by the bandwidth calculating unit 15.

The transmission signal generating unit 17 is implemented by, for example, a transmission signal generating circuit 35 shown in FIG. 3.

The transmission signal generating unit 17 generates a transmission signal having the modulation level determined by the transmission signal determining unit 16 and having the modulation rate determined by the transmission signal determining unit 16.

The transmission signal generated by the transmission signal generating unit 17 is a probabilistically shaped signal which is modulated by a probabilistic shaping (PS) technique. Note that this is merely an example, and the transmission signal generated by the transmission signal generating unit 17 may be a signal modulated by a phase modulation scheme such as quadrature phase shift keying (QPSK) or multilevel quadrature amplitude modulation (QAM).

The electrical-to-optical converter 12a in the optical signal transmitting unit 12 converts the transmission signal generated by the transmission signal generating unit 17 from an electrical signal to an optical signal, and outputs the optical signal to the optical transmitter 12b.

The optical transmitter 12b in the optical signal transmitting unit 12 outputs the optical signal outputted from the electrical-to-optical converter 12a to the multiplexer 4.

The optical signal transmitting unit 12 in the optical transceiver 2-$n_a$ outputs an optical signal which is a transmission signal to the multiplexer 4-1, and the optical signal transmitting unit 12 in the optical transceiver 3-$n_b$ outputs an optical signal which is a transmission signal to the multiplexer 4-2.

The reception signal processing unit 18 is implemented by, for example, a reception signal processing circuit 36 shown in FIG. 3.

The reception signal processing unit 18 performs a reception process on the reception signal which is the electrical signal outputted from the optical-to-electrical converter 13b in the optical signal receiving unit 13, thereby demodulating the reception signal.

In FIG. 2, it is assumed that each of the test signal transmitting unit 11, the test signal receiving unit 14, the bandwidth calculating unit 15, the transmission signal determining unit 16, the transmission signal generating unit 17, and the reception signal processing unit 18 which are components of the digital processing unit 10 is implemented by dedicated hardware such as that shown in FIG. 3. Namely, it is assumed that the digital processing unit 10 is implemented by the test signal transmitting circuit 31, the test signal receiving circuit 32, the bandwidth calculating circuit 33, the transmission signal determining circuit 34, the transmission signal generating circuit 35, and the reception signal processing circuit 36.

Each of the test signal transmitting circuit 31, the test signal receiving circuit 32, the bandwidth calculating circuit 33, the transmission signal determining circuit 34, the transmission signal generating circuit 35, and the reception signal processing circuit 36 corresponds, for example, to a single circuit, a composite circuit, a programmed processor, a parallel programmed processor, an application specific integrated circuit (ASIC), a field-programmable gate array (FPGA), or a combination thereof.

The components of the digital processing unit 10 are not limited to being implemented by dedicated hardware, and may be implemented by software, firmware, or a combination of software and firmware.

The software or firmware is stored as a program in a memory of a computer. The computer means hardware that executes the program, and corresponds, for example, to a central processing unit (CPU), a central processor, a processing unit, an arithmetic unit, a microprocessor, a microcomputer, a processor, or a digital signal processor (DSP).

Figure 4:
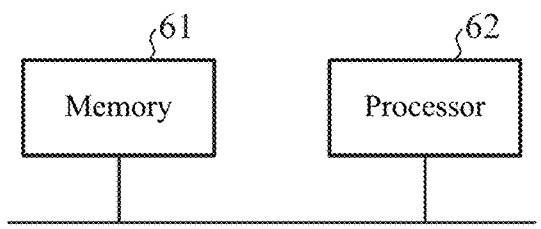

FIG. 4 is a hardware configuration diagram of a computer in a case where the components of the digital processing unit 10 are implemented by software, firmware, or the like.

In a case where the components of the digital processing unit 10 are implemented by software, firmware, or the like, a program for causing a computer to perform a processing procedure performed in each of the test signal transmitting unit 11, the test signal receiving unit 14, the bandwidth calculating unit 15, the transmission signal determining unit 16, the transmission signal generating unit 17, and the reception signal processing unit 18 is stored in a memory 61. Then, a processor 62 of the computer executes the program stored in the memory 61.

In addition, FIG. 3 shows an example in which each of the components of the digital processing unit 10 is implemented by dedicated hardware, and FIG. 4 shows an example in which the digital processing unit 10 is implemented by software, firmware, or the like. However, they are merely examples, and some of the components of the digital processing unit 10 may be implemented by dedicated hardware and the other components may be implemented by software, firmware, or the like.

A relationship between a baud rate which is the modulation rate of a transmission signal and entropy which is the modulation level of the transmission signal will be described.

Figure 5:
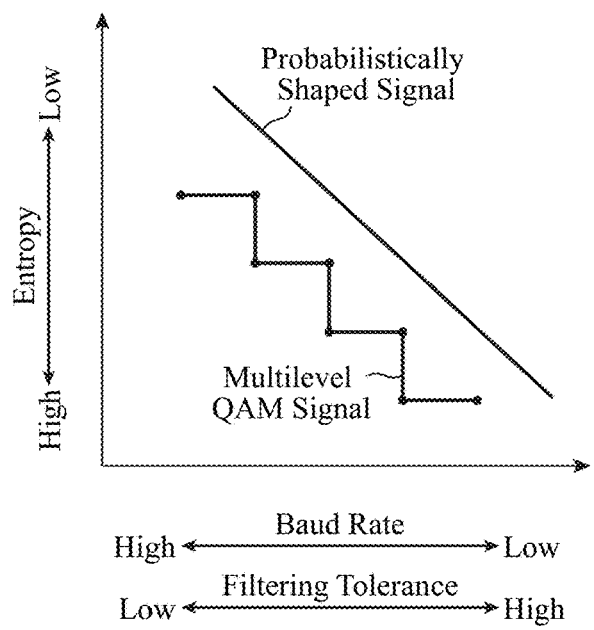
FIG. 5 is an explanatory diagram showing a relationship between a baud rate and entropy.

FIG. 5 is an explanatory diagram showing a relationship between a baud rate and entropy.

FIG. 5 shows a relationship between the baud rate of a transmission signal and the entropy of the transmission signal in a case where the transmission signal is a probabilistically shaped signal or a multilevel QAM signal and the transmission capacity for the transmission signal is constant.

In FIG. 5, the multilevel QAM signal is a signal generated using a multilevel QAM scheme. A transmission signal generated by the transmission signal generating unit 17 is, for example, a probabilistically shaped signal or a multilevel QAM signal.

As shown in FIG. 5, the entropy of a transmission signal increases as the baud rate decreases. In the example of FIG. 5, the entropy of the probabilistically shaped signal and the baud rate of the probabilistically shaped signal have an inversely proportional relationship. Note that the relationship between the entropy of the probabilistically shaped signal and the baud rate of the probabilistically shaped signal is not limited to an inversely proportional relationship and may be, for example, a relationship represented by an exponential function.

As shown in FIG. 5, the filtering tolerance of a transmission signal increases as the baud rate decreases.

The filtering tolerance indicates an allowance for the bandwidth of a transmission signal with respect to the bandwidth of the wavelength filters 6-1a and 6-2a. When the bandwidth of the wavelength filters 6-1a and 6-2a is X, the bandwidth of a transmission signal is Y, and X>Y, the filtering tolerance increases as the bandwidth Y of the transmission signal becomes narrower than the bandwidth X of the wavelength filters 6-1a and 6-2a. When the bandwidth Y of the transmission signal is the same as the bandwidth X of the wavelength filters 6-1a and 6-2a, the filtering tolerance is 0.

Since the bandwidth of a transmission signal becomes narrower as the baud rate of the transmission signal decreases, the filtering tolerance of the transmission signal increases as the baud rate of the transmission signal decreases.

Next, operations of the optical communication system shown in FIG. 1 will be described.

Here, as an example, operations will be described that are performed upon determining a baud rate of a transmission signal and entropy of the transmission signal by sending, by the optical transceiver 2-1, test signals to the transmission line 5 and receiving the test signals by the optical transceiver 3-1.

Timing at which the optical transceiver 2-1 sends test signals to the transmission line 5 and the optical transceiver 3-1 determines a baud rate and entropy is when a control signal that instructs determination of a baud rate and entropy is outputted to each of the optical transceiver 2-1 and the optical transceiver 3-1 from a control apparatus which is not shown.

Note that the control apparatus outputs the control signal to each of the optical transceiver 2-1 and the optical transceiver 3-1 periodically or when there is a request from a user.

Figure 6:
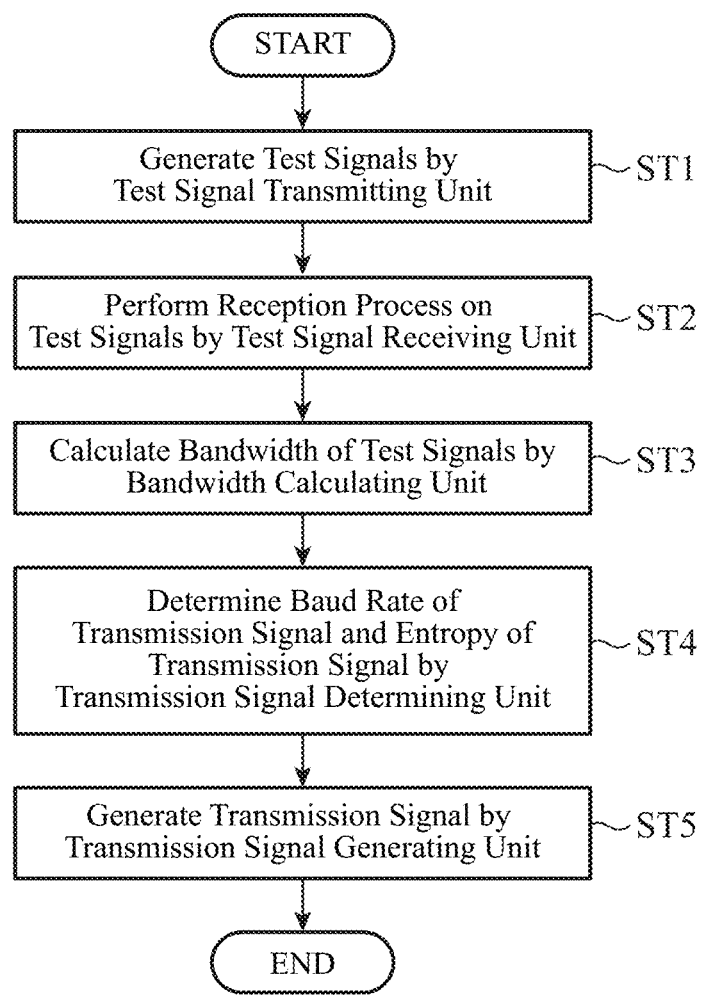
FIG. 6 is a flowchart showing processing procedures performed by the digital processing units 10.

FIG. 6 is a flowchart showing processing procedures performed by the digital processing units 10.

When the test signal transmitting unit 11 in the optical transceiver 2-1 receives a control signal that instructs determination of a baud rate and entropy from the control apparatus, the test signal transmitting unit 11 generates test signals.

Figure 7:
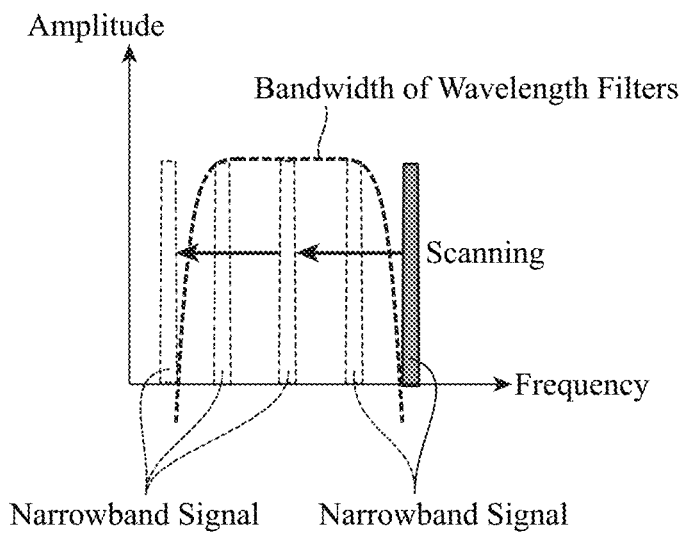
FIG. 7 is an explanatory diagram showing exemplary generation of test signals by a test signal transmitting unit 11.

Namely, as shown in FIG. 7, the test signal transmitting unit 11 in the optical transceiver 2-1 generates, as test signals, a collection of narrowband signals which are a plurality of signals having a narrower bandwidth than the bandwidth of the wavelength filters 6-1a and 6-2a and having different frequencies (step ST1 of FIG. 6).

FIG. 7 is an explanatory diagram showing exemplary generation of test signals by the test signal transmitting unit 11.

In FIG. 7, the horizontal axis represents the frequency of a narrowband signal and the vertical axis represents the amplitude of the narrowband signal.

The broken line represents the bandwidth of the wavelength filters 6-1a and 6-2a, and the bandwidths of the narrowband signals are narrower than the bandwidth of the wavelength filters 6-1a and 6-2a.

In the test signal transmitting unit 11, the bandwidth of the wavelength filters 6-1a and 6-2a is known. The bandwidth of the wavelength filters 6-1a and 6-2a may be, for example, stored in an internal memory of the test signal transmitting unit 11 or provided from a source external to the digital processing unit 10.

FIG. 7 shows an example in which the wavelength filter 6-1a and the wavelength filter 6-2a have the same bandwidth.

When the bandwidth of the wavelength filter 6-1a is wider than the bandwidth of the wavelength filter 6-2a, the bandwidth shown in FIG. 7 is the bandwidth of the wavelength filter 6-1a. In addition, when the bandwidth of the wavelength filter 6-1a is narrower than the bandwidth of the wavelength filter 6-2a, the bandwidth shown in FIG. 7 is the bandwidth of the wavelength filter 6-2a.

Even when the wavelength filter 6-1a and the wavelength filter 6-2a have the same bandwidth, frequency bands for the respective bandwidths may be shifted from each other, by which the frequency bands for the respective bandwidths may partially overlap each other. In addition, when the wavelength filter 6-1a and the wavelength filter 6-2a have different bandwidths, frequency bands for the respective bandwidths may partially overlap each other.

For example, a case is assumed in which the lowest frequency $f_{L1a}$ in the bandwidth of the wavelength filter 6-1a is lower than the lowest frequency $f_{L2a}$ in the bandwidth of the wavelength filter 6-2a, and the highest frequency $f_{H1a}$ in the bandwidth of the wavelength filter 6-1a is lower than the highest frequency $f_{H2a}$ in the bandwidth of the wavelength filter 6-2a and is higher than the lowest frequency $f_{L2a}$ in the bandwidth of the wavelength filter 6-2a.

$$f_{L1a} < f_{L2a} < f_{H1a} < f_{H2a}$$

In this assumed case, the bandwidth shown in FIG. 7 is in a range from the lowest frequency $f_{L1a}$ in the bandwidth of the wavelength filter 6-1a to the highest frequency $f_{H2a}$ in the bandwidth of the wavelength filter 6-2a.

Exemplary generation of test signals by the test signal transmitting unit 11 will be specifically described below.

First, the test signal transmitting unit 11 generates a narrowband signal having a narrower bandwidth than the bandwidth of the wavelength filters shown in FIG. 7 and having a higher frequency than the highest frequency in the bandwidth of the wavelength filters. The narrowband signal is, for example, a polarization-multiplexed narrowband signal.

The test signal transmitting unit 11 outputs the generated narrowband signal as one of test signals to the optical signal transmitting unit 12.

Then, the test signal transmitting unit 11 stepwisely reduces the frequency of the narrowband signal in units of several GHz until the frequency of the narrowband signal reaches lower than the lowest frequency in the bandwidth of the wavelength filters shown in FIG. 7.

Every time the test signal transmitting unit 11 reduces the frequency of the narrowband signal, the test signal transmitting unit 11 outputs the narrowband signal with the reduced frequency as one of test signals to the optical signal transmitting unit 12.

Here, the test signal transmitting unit 11 generates a narrowband signal having a higher frequency than the highest frequency in the bandwidth of the wavelength filters shown in FIG. 7, and stepwisely reduces the frequency of the narrowband signal in units of several GHz until the frequency of the narrowband signal reaches lower than the lowest frequency in the bandwidth of the wavelength filters shown in FIG. 7. However, this is merely an example, and the test signal transmitting unit 11 generates a narrowband signal having a lower frequency than the lowest frequency in the bandwidth of the wavelength filters shown in FIG. 7. In such a case, the test signal transmitting unit 11 stepwisely increase the frequency of the narrowband signal in units of several GHz until the frequency of the narrowband signal reaches higher than the highest frequency in the bandwidth of the wavelength filters shown in FIG. 7.

Every time the electrical-to-optical converter 12a in the optical signal transmitting unit 12 in the optical transceiver 2-1 receives a narrowband signal from the test signal transmitting unit 11, the electrical-to-optical converter 12a converts the narrowband signal from an electrical signal to an optical signal and outputs the optical signal to the optical transmitter 12*b*.

The optical transmitter 12*b* in the optical signal transmitting unit 12 outputs the optical signal outputted from the electrical-to-optical converter 12*a* to the multiplexer 4-1.

The narrowband signal which is the optical signal outputted from the optical signal transmitting unit 12 in the optical transceiver 2-1 is transmitted to the optical transceiver 3-1 through the multiplexer 4-1, the transmission line 5, the wavelength filter 6-1*a* in the optical splitter 6-1, the transmission line 5, the wavelength filter 6-2*a* in the optical splitter 6-2, the transmission line 5, and the multiplexer 4-2.

When the frequency of a narrowband signal is higher than the highest frequency in the bandwidth of the wavelength filter 6-1*a* or the highest frequency in the bandwidth of the wavelength filter 6-2*a*, the narrowband signal is not transmitted to the optical transceiver 3-1.

When the frequency of a narrowband signal is lower than the lowest frequency in the bandwidth of the wavelength filter 6-1*a* or the lowest frequency in the bandwidth of the wavelength filter 6-2*a*, the narrowband signal is not transmitted to the optical transceiver 3-1.

Thus, a narrowband signal to be transmitted to the optical transceiver 3-1 is a narrowband signal having a frequency included in a frequency band for the bandwidth of the wavelength filter 6-1*a* and included in a frequency band for the bandwidth of the wavelength filter 6-2*a*.

Here, the optical signal transmitting unit 12 in the optical transceiver 2-1 outputs each of narrowband signals in turn to the multiplexer 4-1, as one of test signals. However, this is merely an example, and the optical signal transmitting unit 12 in the optical transceiver 2-1 may simultaneously output a plurality of narrowband signals to the multiplexer 4-1. Namely, the optical signal transmitting unit 12 in the optical transceiver 2-1 may output test signals which are a collection of a plurality of narrowband signals to the multiplexer 4-1.

When the optical signal receiving unit 13 in the optical transceiver 3-1 receives a control signal that instructs determination of a baud rate and entropy from the control apparatus, the optical signal receiving unit 13 receives, as narrowband signals, the optical signals sent to the transmission line 5 from the optical signal transmitting unit 12 in the optical transceiver 2-1.

Namely, the optical receiver 13*a* in the optical signal receiving unit 13 in the optical transceiver 3-1 receives each of the narrowband signals having passed through the wavelength filters 6-1*a* and 6-2*a*.

The optical-to-electrical converter 13*b* in the optical signal receiving unit 13 converts each of the narrowband signals received by the optical receiver 13*a* from an optical signal to an electrical signal, and outputs each of the electrical signals to the test signal receiving unit 14 in the optical transceiver 3-1.

The test signal receiving unit 14 in the optical transceiver 3-1 performs a reception process on a narrowband signal which is each of the electrical signals outputted from the optical-to-electrical converter 13*b* in the optical signal receiving unit 13, thereby demodulating the narrowband signal (step ST2 of FIG. 6).

The test signal receiving unit 14 outputs each of the demodulated narrowband signals to the bandwidth calculating unit 15.

When the bandwidth calculating unit 15 in the optical transceiver 3-1 receives each of the narrowband signals from the test signal receiving unit 14, the bandwidth calculating unit 15 performs, for example, a fast Fourier transform on test signals which are a collection of the plurality of narrowband signals, thereby calculating frequencies of the test signals.

When the bandwidth calculating unit 15 calculates the frequencies of the test signals, the bandwidth calculating unit 15 identifies the lowest frequency $f_L$ and the highest frequency $f_H$ among the calculated frequencies.

Figure 8:
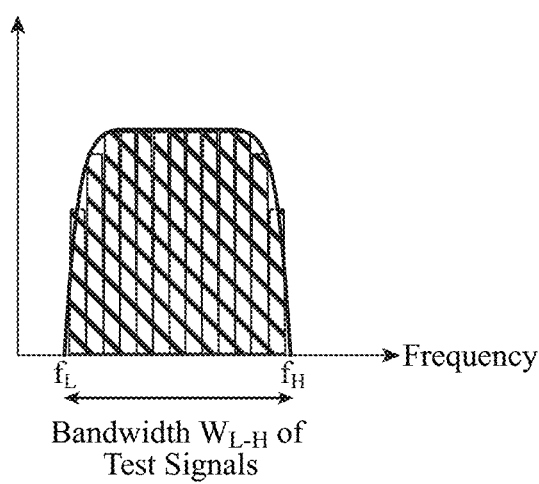

As shown in FIG. 8, the bandwidth calculating unit 15 calculates a bandwidth from the lowest frequency $f_L$ to the highest frequency $f_H$ as a bandwidth $W_{L-H}$ of the test signals having passed through the wavelength filters 6-1*a* and 6-2*a* (step ST3 of FIG. 6).

FIG. 8 is an explanatory diagram showing a bandwidth $W_{L-H}$ of test signals having passed through the wavelength filters 6-1*a* and 6-2*a*.

Characteristics of the transmission lines 5 of the optical communication network may change due to deterioration over time. A bandwidth $W_{L-H}$ of test signals calculated by the bandwidth calculating unit 15 changes with the change in the characteristics of the transmission lines 5. Hence, even if the characteristics of the transmission lines 5 have changed due to deterioration over time, the bandwidth calculating unit 15 can calculate an accurate bandwidth $W_{L-H}$ of test signals.

The bandwidth calculating unit 15 outputs bandwidth information indicating the bandwidth $W_{L-H}$ of the test signals to the transmission signal determining unit 16.

When the transmission signal determining unit 16 in the optical transceiver 3-1 receives the bandwidth information from the bandwidth calculating unit 15, the transmission signal determining unit 16 determines a baud rate B of a transmission signal and entropy E of the transmission signal depending on the bandwidth $W_{L-H}$ of the test signals indicated by the bandwidth information (step ST4 of FIG. 6).

A process of determining the baud rate B and the entropy E by the transmission signal determining unit 16 will be specifically described below.

First, the transmission signal determining unit 16 determines the bandwidth $W_{L-H}$ of the test signals as a signal band Ws of a transmission signal. Namely, the relation Ws=$W_{L-H}$ is satisfied.

As described above, the signal band Ws of a transmission signal becomes narrower as the baud rate B of the transmission signal decreases, and in the transmission signal determining unit 16, a correspondence between the baud rate B of a transmission signal and the signal band Ws of the transmission signal is known.

In addition, in the transmission signal determining unit 16, a correspondence between the baud rate B of a transmission signal and the entropy E of the transmission signal is known.

Each of the correspondence between the baud rate B and the signal band Ws and the correspondence between the baud rate B and the entropy E may be, for example, stored in an internal memory of the transmission signal determining unit 16 or provided from a source external to the digital processing unit 10.

The transmission signal determining unit 16 identifies a baud rate B of the transmission signal associated with the determined signal band Ws of the transmission signal, depending on the known correspondence.

In addition, the transmission signal determining unit 16 identifies entropy E of the transmission signal associated with the identified baud rate B of the transmission signal, depending on the known correspondence.

The transmission signal determining unit 16 outputs identification information indicating the identified baud rate B of the transmission signal and the identified entropy E to the transmission signal generating unit 17.

Here, the transmission signal determining unit 16 determines the baud rate B of the transmission signal depending on the bandwidth $W_{L-H}$ of the test signals indicated by the bandwidth information. The transmission signal determining unit 16 can also change the baud rate B of the transmission signal by changing the code rate of error correction coding for the transmission signal depending on the bandwidth $W_{L-H}$ of the test signals.

After determining the baud rate B and the entropy E by the transmission signal determining unit 16, the control apparatus which is not shown outputs a control signal that instructs transmission and reception of an optical signal which is a transmission signal, to each of the optical transceiver 2-1 and the optical transceiver 3-1.

When the transmission signal generating unit 17 in the optical transceiver 3-1 receives the control signal that instructs transmission and reception of an optical signal which is a transmission signal from the control apparatus, the transmission signal generating unit 17 generates a transmission signal.

Namely, the transmission signal generating unit 17 in the optical transceiver 3-1 generates a transmission signal having the entropy E which is indicated by the identification information outputted from the transmission signal determining unit 16, and having the baud rate B indicated by the identification information (step ST5 of FIG. 6).

The transmission signal generating unit 17 outputs the generated transmission signal to the optical signal transmitting unit 12.

When the electrical-to-optical converter 12a in the optical signal transmitting unit 12 in the optical transceiver 3-1 receives the transmission signal from the transmission signal generating unit 17, the electrical-to-optical converter 12a converts the transmission signal from an electrical signal to an optical signal and outputs the optical signal to the optical transmitter 12b.

The optical transmitter 12b in the optical signal transmitting unit 12 outputs the optical signal which is the transmission signal to the multiplexer 4-2.

The optical signal outputted from the optical signal transmitting unit 12 in the optical transceiver 3-1 is transmitted to the optical transceiver 2-1 through the multiplexer 4-2, the transmission line 5, the wavelength filter 6-2a in the optical splitter 6-2, the transmission line 5, the wavelength filter 6-1a in the optical splitter 6-1, the transmission line 5, and the multiplexer 4-1.

The bandwidth of the transmission signal transmitted to the optical transceiver 2-1 is roughly identical to the bandwidth of the test signals transmitted to the optical transceiver 3-1.

When the optical signal receiving unit 13 in the optical transceiver 2-1 receives a control signal that instructs transmission and reception of an optical signal which is a transmission signal from the control apparatus, the optical signal receiving unit 13 receives, as a reception signal, the optical signal sent to the transmission line 5 from the optical signal transmitting unit 12 in the optical transceiver 3-1.

Namely, the optical receiver 13a in the optical signal receiving unit 13 in the optical transceiver 2-1 receives, as a reception signal, the optical signal having passed through the wavelength filters 6-1a and 6-2a.

The optical-to-electrical converter 13b in the optical signal receiving unit 13 converts the reception signal received by the optical receiver 13a from an optical signal to an electrical signal, and outputs the electrical signal to the reception signal processing unit 18 in the optical transceiver 2-1.

The reception signal processing unit 18 in the optical transceiver 2-1 performs a reception process on the reception signal which is the electrical signal outputted from the optical-to-electrical converter 13b in the optical signal receiving unit 13, thereby demodulating the reception signal.

In the first embodiment described above, the optical transceivers 2-$n_a$ and 3-$n_b$ are configured to include the bandwidth calculating unit 15 that calculates, when test signals are sent to the transmission line 5 of the optical communication network from the test signal transmitting unit 11 and the test signal receiving unit 14 receives the test signals having passed through the wavelength filters 6-1a and 6-2a, a bandwidth of the test signals having passed through the wavelength filters 6-1a and 6-2a from the test signals received by the test signal receiving unit 14, the test signal transmitting unit 11 generating, as the test signals, a collection of narrowband signals, the narrowband signals being a plurality of signals having a narrower bandwidth than the bandwidth of the wavelength filters 6-1a and 6-2a and having different frequencies, and the wavelength filter being included in an optical splitter inserted in the transmission line; and the transmission signal determining unit 16 that performs determination of a modulation rate of a transmission signal and a modulation level of the transmission signal depending on the bandwidth of the test signals calculated by the bandwidth calculating unit 15. Thus, the optical transceivers 2-$n_a$ and 3-$n_b$ can increase the transmission capacity of the optical communication network over one that calculates a bandwidth of an optical signal having passed through all wavelength filters through which the optical signal passes, on the basis of the number of the wavelength filters through which the optical signal passes.

Second Embodiment

In a second embodiment, optical transceivers 2-$n_a$ and 3-$n_b$ each including an optical signal-to-noise-ratio calculating unit 19 that calculates an optical signal-to-noise ratio (OSNR) of test signals received by a test signal receiving unit 14 are described.

A configuration of an optical communication system according to the second embodiment is the same as the configuration of the optical communication system according to the first embodiment, and a configuration diagram showing the optical communication system according to the second embodiment is shown in FIG. 1.

Figure 9:
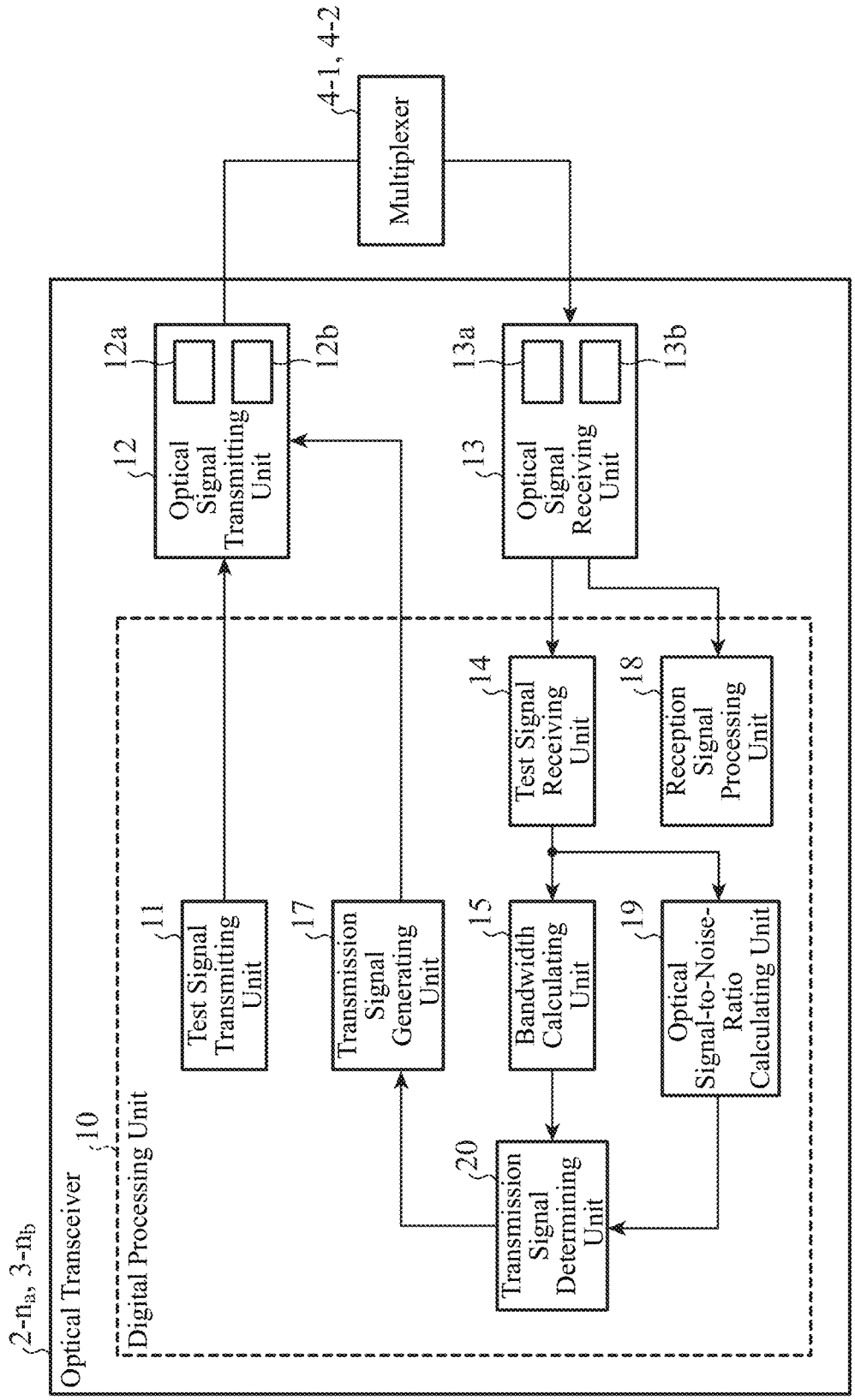
FIG. 9 is a configuration diagram showing optical transceivers 2-$n_a$ and 3-$n_b$ according to a second embodiment.

FIG. 9 is a configuration diagram showing the optical transceivers 2-$n_a$ and 3-$n_b$ according to the second embodiment. In FIG. 9, the same reference signs as those of FIG. 2 indicate the same or corresponding portions and thus description thereof is omitted.

Figure 10:
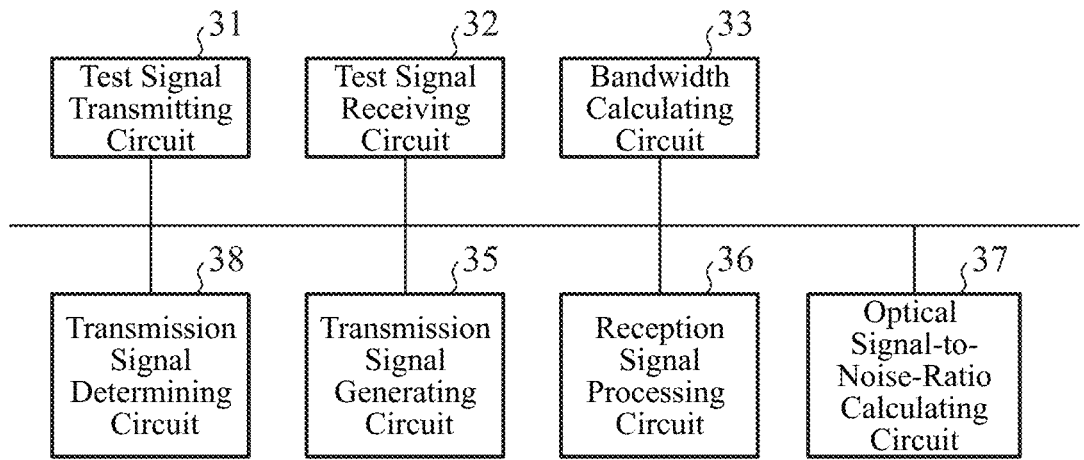
FIG. 10 is a hardware configuration diagram showing hardware of a digital processing unit 10.

FIG. 10 is a hardware configuration diagram showing hardware of a digital processing unit 10. In FIG. 10, the same reference signs as those of FIG. 3 indicate the same or corresponding portions and thus description thereof is omitted.

The optical signal-to-noise-ratio calculating unit 19 is implemented by, for example, an optical signal-to-noise-ratio calculating circuit 37 shown in FIG. 10.

The optical signal-to-noise-ratio calculating unit 19 calculates an OSNR of test signals received by the test signal receiving unit 14.

The optical signal-to-noise-ratio calculating unit 19 outputs the OSNR of the test signals to a transmission signal determining unit 20.

The transmission signal determining unit 20 is implemented by, for example, a transmission signal determining circuit 38 shown in FIG. 10.

The transmission signal determining unit 20 determines a baud rate B which is a modulation rate of a transmission signal and entropy E which is a modulation level of the transmission signal, depending on each of a bandwidth of the test signals calculated by a bandwidth calculating unit 15 and the optical signal-to-noise ratio calculated by the optical signal-to-noise-ratio calculating unit 19.

In FIG. 9, it is assumed that each of a test signal transmitting unit 11, the test signal receiving unit 14, the bandwidth calculating unit 15, a transmission signal generating unit 17, a reception signal processing unit 18, the optical signal-to-noise-ratio calculating unit 19, and the transmission signal determining unit 20 which are components of the digital processing unit 10 is implemented by dedicated hardware such as that shown in FIG. 10. Namely, it is assumed that the digital processing unit 10 is implemented by a test signal transmitting circuit 31, a test signal receiving circuit 32, a bandwidth calculating circuit 33, a transmission signal generating circuit 35, a reception signal processing circuit 36, the optical signal-to-noise-ratio calculating circuit 37, and the transmission signal determining circuit 38.

Each of the test signal transmitting circuit 31, the test signal receiving circuit 32, the bandwidth calculating circuit 33, the transmission signal generating circuit 35, the reception signal processing circuit 36, the optical signal-to-noise-ratio calculating circuit 37, and the transmission signal determining circuit 38 corresponds, for example, to a single circuit, a composite circuit, a programmed processor, a parallel programmed processor, an ASIC, an FPGA, or a combination thereof.

The components of the digital processing unit 10 are not limited to being implemented by dedicated hardware, and may be implemented by software, firmware, or a combination of software and firmware.

In a case where the components of the digital processing unit 10 are implemented by software, firmware, or the like, a program for causing a computer to perform a processing procedure performed in each of the test signal transmitting unit 11, the test signal receiving unit 14, the bandwidth calculating unit 15, the transmission signal generating unit 17, the reception signal processing unit 18, the optical signal-to-noise-ratio calculating unit 19, and the transmission signal determining unit 20 is stored in the memory 61 shown in FIG. 4. Then, the processor 62 of the computer executes the program stored in the memory 61.

In addition, FIG. 10 shows an example in which each of the components of the digital processing unit 10 is implemented by dedicated hardware, and FIG. 4 shows an example in which the digital processing unit 10 is implemented by software, firmware, or the like. However, they are merely examples, and some of the components of the digital processing unit 10 may be implemented by dedicated hardware and the other components may be implemented by software, firmware, or the like.

Figure 11:
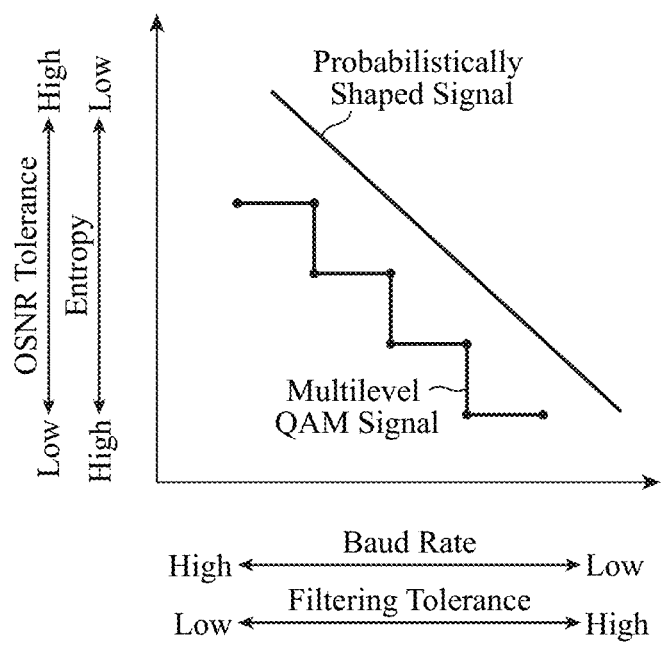
FIG. 11 is an explanatory diagram showing a relationship between a baud rate, entropy, and OSNR tolerance.

FIG. 11 is an explanatory diagram showing a relationship between a baud rate, entropy, and OSNR tolerance.

$OSNR_0$ which is an error correction limit increases as the baud rate B decreases, and the signal band Ws of a transmission signal becomes narrower as the baud rate B decreases. Thus, $OSNR_0$ which is an error correction limit increases as the signal band Ws of the transmission signal becomes narrower.

As shown in FIG. 11, the OSNR tolerance decreases as the baud rate B decreases. The OSNR tolerance indicates an allowance for the OSNR of a transmission signal with respect to $OSNR_0$ which is an error correction limit.

Thus, the OSNR tolerance decreases as $OSNR_0$ which is an error correction limit increases.

Next, operations of the optical communication system according to the second embodiment will be described. Note that components other than the optical signal-to-noise-ratio calculating unit 19 and the transmission signal determining unit 20 are the same as those of the optical communication system according to the first embodiment, and thus, here, operations of the optical signal-to-noise-ratio calculating unit 19 and the transmission signal determining unit 20 will be mainly described.

The test signal receiving unit 14 in the optical transceiver 3-1 outputs demodulated test signals to each of the bandwidth calculating unit 15 and the optical signal-to-noise-ratio calculating unit 19.

When the optical signal-to-noise-ratio calculating unit 19 in the optical transceiver 3-1 receives the test signals from the test signal receiving unit 14, the optical signal-to-noise-ratio calculating unit 19 calculates an OSNR of the test signals.

A process itself of calculating the OSNR of the test signals is a publicly known technique and thus a detailed description thereof is omitted.

When the transmission signal determining unit 20 in the optical transceiver 3-1 receives bandwidth information from the bandwidth calculating unit 15, as with the transmission signal determining unit 16 shown in FIG. 2, the transmission signal determining unit 20 determines a baud rate B of a transmission signal and entropy E of the transmission signal depending on a bandwidth $W_{L-H}$ of the test signals indicated by the bandwidth information.

Then, the transmission signal determining unit 20 compares the OSNR calculated by the optical signal-to-noise-ratio calculating unit 19 with $OSNR_0$ which is an error correction limit. $OSNR_0$ which is an error correction limit may be stored in an internal memory of the transmission signal determining unit 20 or may be provided from a source external to the digital processing unit 10.

When the OSNR calculated by the optical signal-to-noise-ratio calculating unit 19 is lower than $OSNR_0$ which is an error correction limit, the transmission signal determining unit 20 changes each of the determined baud rate B and entropy E.

When the OSNR calculated by the optical signal-to-noise-ratio calculating unit 19 is lower than $OSNR_0$ which is an error correction limit, error correction for a transmission signal cannot be performed.

In a case of a wider bandwidth $W_{L-H'}$ than the bandwidth $W_{L-H}$ ($W_{L-H} < W_{L-H'}$), $OSNR_0$ which is an error correction limit for the bandwidth $W_{L-H'}$ is lower than $OSNR_0$ which is an error correction limit for the bandwidth $W_{L-H}$. When $OSNR_0$ which is an error correction limit decreases, the OSNR calculated by the optical signal-to-noise-ratio calculating unit 19 approaches $OSNR_0$ which is an error correction limit.

In a case of a bandwidth $W_{L-H'}$ in which the OSNR calculated by the optical signal-to-noise-ratio calculating unit 19 is equal to or greater than $OSNR_0$ which is an error correction limit, error correction for a transmission signal can be performed.

Hence, the transmission signal determining unit 20 identifies a bandwidth $W_{L-H'}$ where the OSNR calculated by the optical signal-to-noise-ratio calculating unit 19 is equal to or greater than $OSNR_0$ which is an error correction limit.

As described above, the OSNR tolerance decreases as the baud rate B decreases, the signal band Ws of a transmission signal becomes narrower as the baud rate B decreases, and the OSNR tolerance decreases as $OSNR_0$ which is an error correction limit increases. Thus, in the transmission signal determining unit 20, a correspondence between the signal band Ws of a transmission signal and $OSNR_0$ which is an error correction limit is known, and the transmission signal determining unit 20 identifies a bandwidth $W_{L-H'}$ in which the OSNR calculated by the optical signal-to-noise-ratio calculating unit 19 is equal to or greater than $OSNR_0$ which is an error correction limit, by referring to the correspondence.

The transmission signal determining unit 20 determines a baud rate B of a transmission signal and entropy E of the transmission signal depending on the identified bandwidth $W_{L-H'}$.

The transmission signal determining unit 20 outputs identification information indicating the identified baud rate B of a transmission signal and the identified entropy E to the transmission signal generating unit 17.

In the second embodiment described above, the optical transceivers 2-$n_a$ and 3-$n_b$ are configured in such a manner that the transmission signal determining unit 20 determines a modulation rate of a transmission signal and a modulation level of the transmission signal depending on each of a bandwidth of test signals calculated by the bandwidth calculating unit 15 and an optical signal-to-noise ratio of the test signals calculated by the optical signal-to-noise-ratio calculating unit 19. Thus, the optical transceivers 2-$n_a$ and 3-$n_b$ according to the second embodiment can determine the modulation rate of a transmission signal and the modulation level of the transmission signal with higher accuracy than the optical transceivers 2-$n_a$ and 3-$n_b$ according to the first embodiment.

Third Embodiment

In a third embodiment, optical transceivers 2-$n_a$ and 3-$n_b$ in which a test signal transmitting unit 51 includes a light source 52, an optical modulator 53, and a control circuit 54 are described.

A configuration of an optical communication system according to the third embodiment is the same as the configuration of the optical communication system according to the first embodiment, and a configuration diagram showing the optical communication system according to the third embodiment is shown in FIG. 1.

Figure 12:
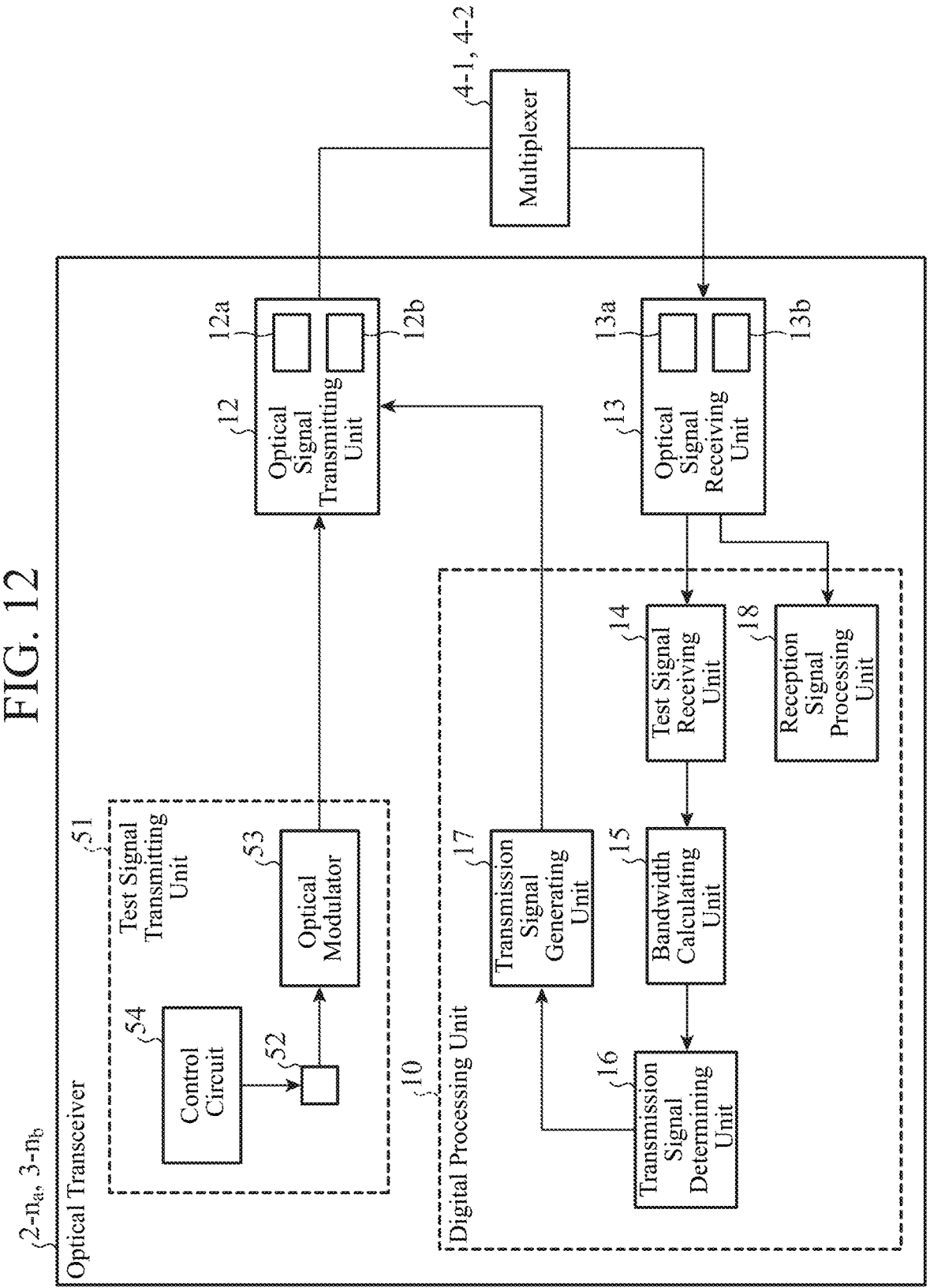
FIG. 12 is a configuration diagram showing optical transceivers 2-$n_a$ and 3-$n_b$ according to a third embodiment.

FIG. 12 is a configuration diagram showing the optical transceivers 2-$n_a$ and 3-$n_b$ according to the third embodiment. In FIG. 12, the same reference signs as those of FIG. 2 indicate the same or corresponding portions and thus description thereof is omitted.

The test signal transmitting unit 51 includes the light source 52, the optical modulator 53, and the control circuit 54.

The test signal transmitting unit 51 generates, as test signals, a collection of narrowband signals which are a plurality of signals having a narrower bandwidth than the bandwidth of wavelength filters 6-1$a$ and 6-2$a$ and having different frequencies.

The test signal transmitting unit 51 is provided external to a digital processing unit 10. Thus, the digital processing unit 10 does not include a test signal transmitting circuit 31 as hardware.

The light source 52 outputs continuous light having a narrower bandwidth than the bandwidth of the wavelength filters 6-1$a$ and 6-2$a$ to the optical modulator 53.

The optical modulator 53 performs pulse modulation on the continuous light outputted from the light source 52, thereby generating a narrowband signal, and sends the narrowband signal as one of test signals to a transmission line 5 through an optical signal transmitting unit 12 or the like.

The control circuit 54 switches the frequency of continuous light to be outputted from the light source 52. By the control circuit 54 switching the frequency of continuous light to be outputted from the light source 52, a plurality of narrowband signals having different frequencies is sent to the transmission line 5.

In the optical transceivers 2-$n_a$ and 3-$n_b$ shown in FIG. 12, the test signal transmitting unit 51 is applied to the optical transceivers 2-$n_a$ and 3-$n_b$ shown in FIG. 2. However, this is merely an example, and the test signal transmitting unit 51 may be applied to the optical transceivers 2-$n_a$ and 3-$n_b$ shown in FIG. 9.

Next, operations of the optical communication system according to the third embodiment will be described. Note that components other than the test signal transmitting unit 51 are the same as those of the optical communication system according to the first embodiment, and thus, here, only operations of the test signal transmitting unit 51 will be described.

The light source 52 in the test signal transmitting unit 51 outputs continuous light having a narrower bandwidth than the bandwidth of the wavelength filters 6-1$a$ and 6-2$a$ to the optical modulator 53.

When the optical modulator 53 receives the continuous light from the light source 52, the optical modulator 53 performs pulse modulation on the continuous light, thereby generating a narrowband signal having a frequency f, and outputs the narrowband signal having the frequency f as one of test signals to the optical signal transmitting unit 12.

The narrowband signal generated by the optical modulator 53 is, for example, a signal having a narrower bandwidth than the bandwidth of the wavelength filters shown in FIG. 7 and having a frequency f higher than the highest frequency in the bandwidth of the wavelength filters.

The control circuit 54 switches the frequency of continuous light to be outputted from the light source 52, until the frequency f of a narrowband signal reaches a frequency lower than the lowest frequency in the bandwidth of the wavelength filters shown in FIG. 7. By the control circuit 54 switching the frequency of continuous light to be outputted from the light source 52, the frequency f of a narrowband signal stepwisely decreases in units of several GHz.

The optical modulator 53 outputs a plurality of narrowband signals having different frequencies f to the optical signal transmitting unit 12.

In the test signal transmitting unit 51 shown in FIG. 12, the optical modulator 53 generates a narrowband signal having a higher frequency than the highest frequency in the bandwidth of the wavelength filters shown in FIG. 7. Then, the control circuit 54 switches the frequency of light to be outputted from the light source 52, until the frequency of a narrowband signal reaches lower than the lowest frequency in the bandwidth of the wavelength filters shown in FIG. 7. However, this is merely an example, and the optical modulator 53 generates a narrowband signal having a lower frequency than the lowest frequency in the bandwidth of the wavelength filters shown in FIG. 7. Then, the control circuit 54 may switch the frequency of light to be outputted from the light source 52, until the frequency of a narrowband signal reaches higher than the highest frequency in the bandwidth of the wavelength filters shown in FIG. 7.

The test signal transmitting unit 51 shown in FIG. 12 includes the light source 52 that outputs continuous light having a narrower bandwidth than the bandwidth of the wavelength filters 6-1a and 6-2a; the optical modulator 53 that performs pulse modulation on the continuous light outputted from the light source 52, thereby generating a narrowband signal; and the control circuit 54 that switches the frequency of continuous light to be outputted from the light source 52. Thus, as with the test signal transmitting unit 11 shown in FIG. 2, the test signal transmitting unit 51 shown in FIG. 12 can increase the transmission capacity of an optical communication network over one that calculates a bandwidth of an optical signal having passed through all wavelength filters through which the optical signal passes, on the basis of the number of the wavelength filters through which the optical signal passes.

Fourth Embodiment

A fourth embodiment describes an optical communication system in which a second optical transceiver includes a bandwidth information transmitting unit 21 that transmits bandwidth information indicating a bandwidth $W_{L-H}$ of test signals which is calculated by a bandwidth calculating unit 15.

A configuration of the optical communication system according to the fourth embodiment is the same as the configuration of the optical communication system according to the first embodiment, and a configuration diagram showing the optical communication system according to the fourth embodiment is shown in FIG. 1.

Figure 13:
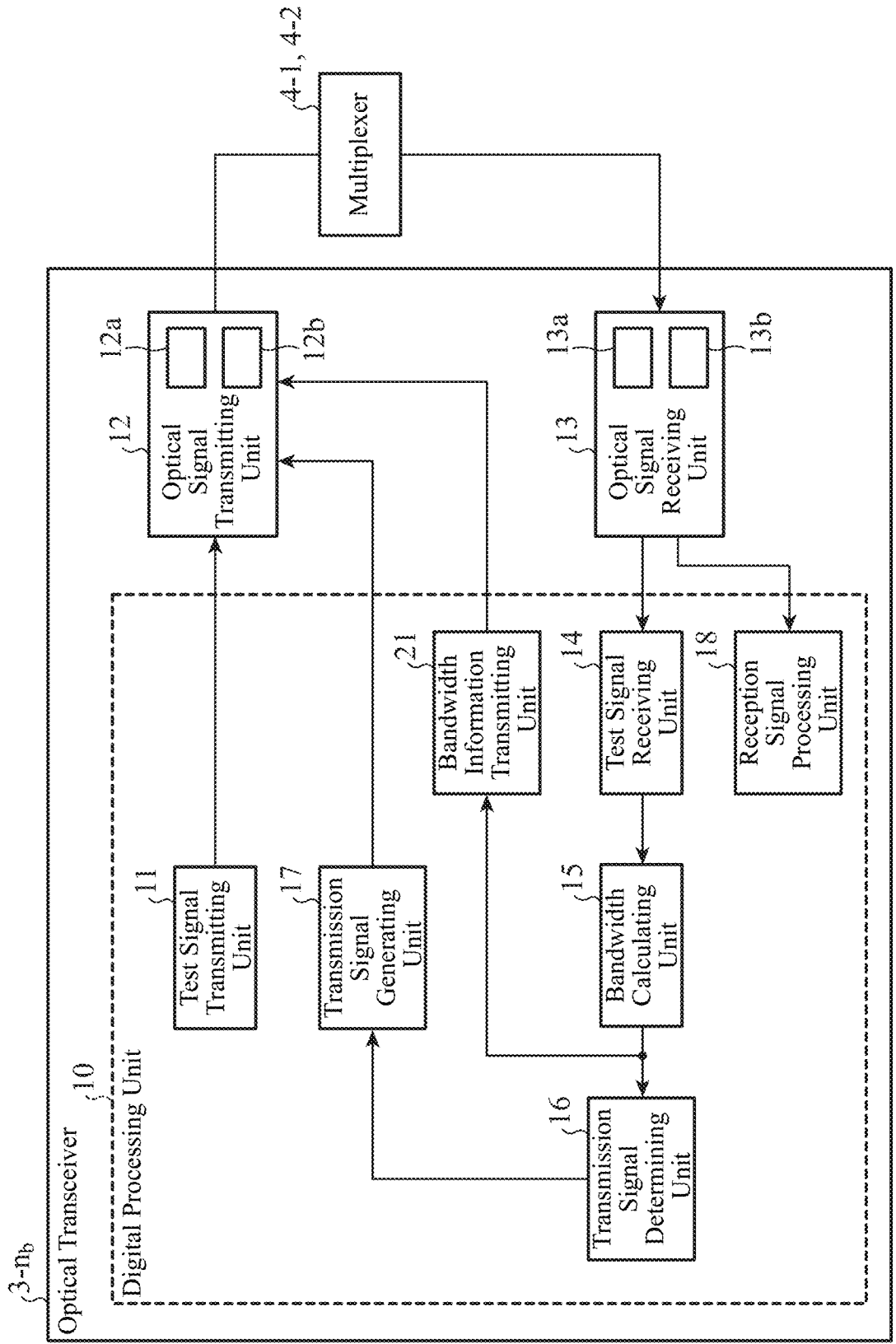
FIG. 13 is a configuration diagram showing an optical transceiver 3-$n_b$ according to a fourth embodiment.

FIG. 13 is a configuration diagram showing an optical transceiver 3-$n_b$ according to the fourth embodiment. In FIG. 13, the same reference signs as those of FIG. 2 indicate the same or corresponding portions and thus description thereof is omitted.

Figure 14:
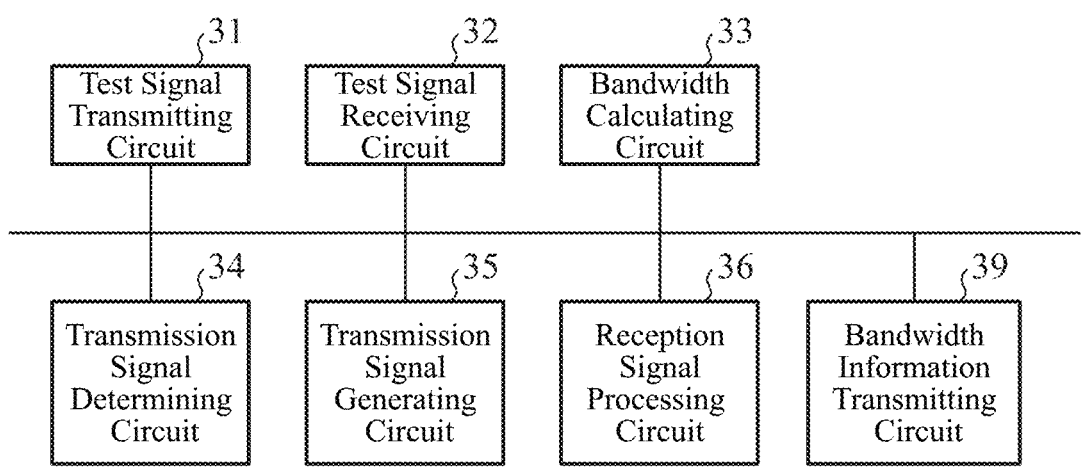
FIG. 14 is a hardware configuration diagram showing hardware of a digital processing unit 10 in the optical transceiver 3-$n_b$.

FIG. 14 is a hardware configuration diagram showing hardware of a digital processing unit 10 in the optical transceiver 3-$n_b$. In FIG. 14, the same reference signs as those of FIG. 3 indicate the same or corresponding portions and thus description thereof is omitted.

The bandwidth information transmitting unit 21 is implemented by, for example, a bandwidth information transmitting circuit 39 shown in FIG. 14.

The bandwidth information transmitting unit 21 in the optical transceiver 3-$n_b$ transmits bandwidth information indicating a bandwidth $W_{L-H}$ of test signals which is calculated by the bandwidth calculating unit 15 in the optical transceiver 3-$n_b$ to an optical transceiver 2-$n_a$ through an optical signal transmitting unit 12 or the like.

Figure 15:
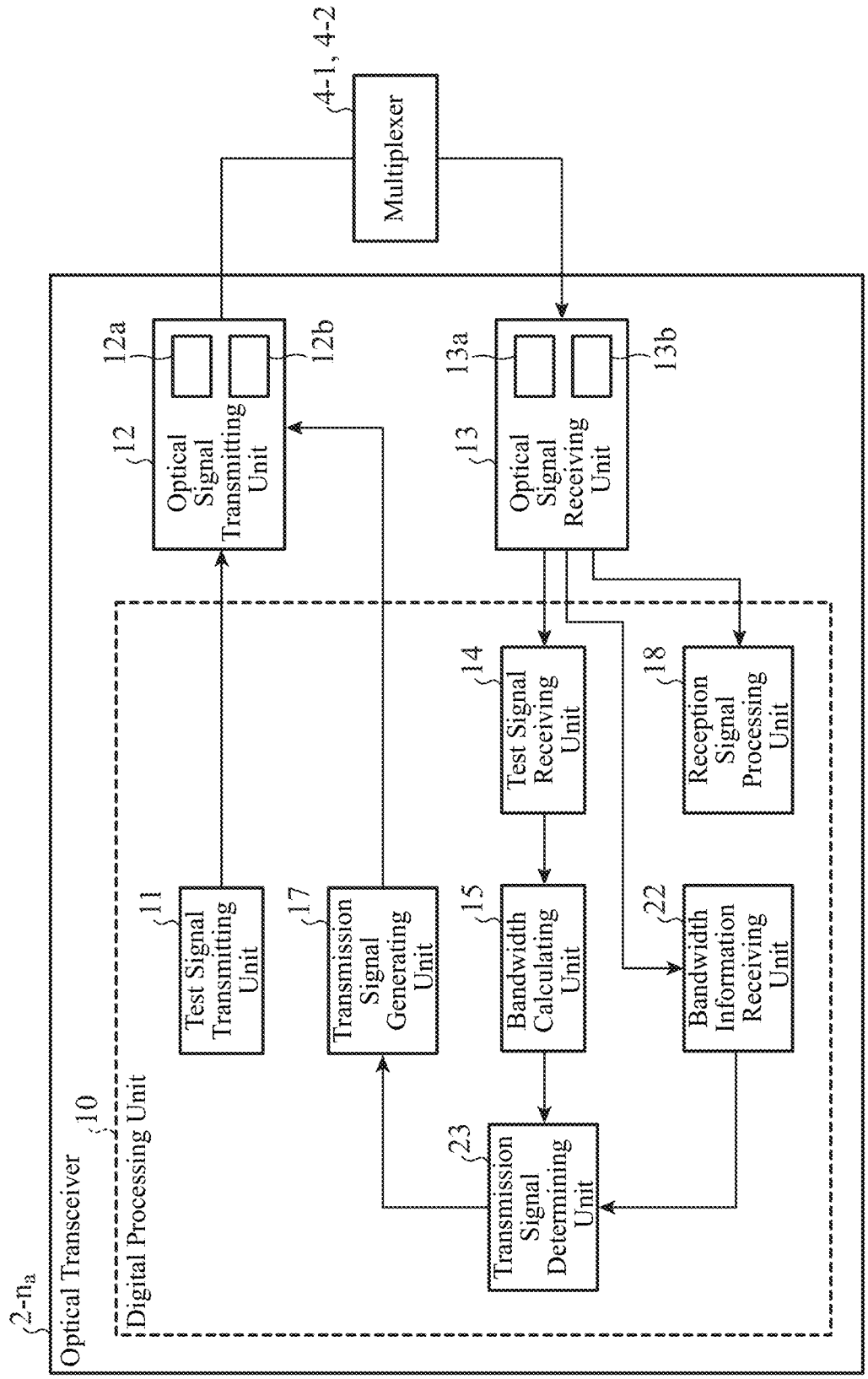
FIG. 15 is a configuration diagram showing an optical transceiver 2-$n_a$ according to the fourth embodiment.

FIG. 15 is a configuration diagram showing the optical transceiver 2-$n_a$ according to the fourth embodiment. In FIG. 15, the same reference signs as those of FIG. 2 indicate the same or corresponding portions and thus description thereof is omitted.

Figure 16:
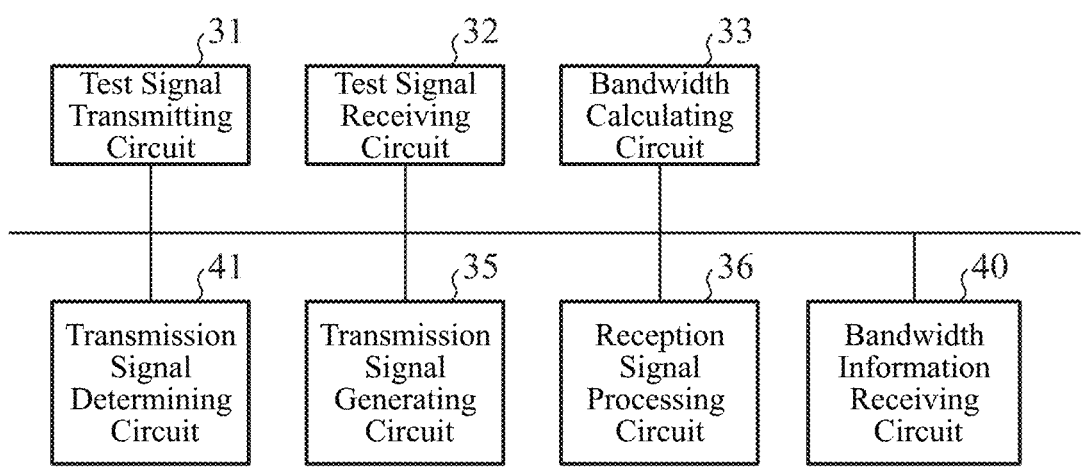
FIG. 16 is a hardware configuration diagram showing hardware of a digital processing unit 10 in the optical transceiver 2-$n_a$.

FIG. 16 is a hardware configuration diagram showing hardware of a digital processing unit 10 in the optical transceiver 2-$n_a$. In FIG. 16, the same reference signs as those of FIG. 3 indicate the same or corresponding portions and thus description thereof is omitted.

An optical receiver 13a in an optical signal receiving unit 13 receives bandwidth information having been outputted to a multiplexer 4-2 from the optical signal transmitting unit 12 in the optical transceiver 3-$n_b$ and then having passed through wavelength filters 6-2a and 6-1a. An optical-to-electrical converter 13b in the optical signal receiving unit 13 converts the bandwidth information received by the optical receiver 13a from an optical signal to an electrical signal, and outputs the electrical signal to a bandwidth information receiving unit 22 which will be described later.

The bandwidth information receiving unit 22 is implemented by, for example, a bandwidth information receiving circuit 40 shown in FIG. 16.

The bandwidth information receiving unit 22 performs a reception process on the bandwidth information which is the electrical signal outputted from the optical-to-electrical converter 13b in the optical signal receiving unit 13, thereby demodulating the bandwidth information, and outputs the demodulated bandwidth information to a transmission signal determining unit 23 which will be described later.

The transmission signal determining unit 23 is implemented by, for example, a transmission signal determining circuit 41 shown in FIG. 16.

The transmission signal determining unit 23 determines a modulation level of a transmission signal and a modulation rate of the transmission signal depending on a bandwidth $_{L-H}$ of test signals calculated by a bandwidth calculating unit 15 or the bandwidth $W_{L-H}$ indicated by the bandwidth information received by the bandwidth information receiving unit 22.

Here, with the optical transceiver 2-$n_a$ being a first optical transceiver, the optical transceiver 2-$n_a$ includes the bandwidth information receiving unit 22 and the transmission signal determining unit 23, and with the optical transceiver 3-$n_b$ being a second optical transceiver, the optical transceiver 3-$n_b$ includes the bandwidth information transmitting unit 21.

However, this is merely an example, and with the optical transceiver 3-$n_b$ being a first optical transceiver, the optical transceiver 3-$n_b$ may include the bandwidth information receiving unit 22 and the transmission signal determining unit 23, and with the optical transceiver 2-$n_a$ being a second optical transceiver, the optical transceiver 2-$n_a$ may include the bandwidth information transmitting unit 21.

In FIG. 13, it is assumed that each of a test signal transmitting unit 11, a test signal receiving unit 14, the bandwidth calculating unit 15, a transmission signal determining unit 16, a transmission signal generating unit 17, a reception signal processing unit 18, and the bandwidth information transmitting unit 21 which are components of the digital processing unit 10 in the optical transceiver 3-$n_b$ is implemented by dedicated hardware such as that shown in FIG. 14. Namely, it is assumed that the digital processing unit 10 is implemented by a test signal transmitting circuit 31, a test signal receiving circuit 32, a bandwidth calculating circuit 33, a transmission signal determining circuit 34, a transmission signal generating circuit 35, a reception signal processing circuit 36, and the bandwidth information transmitting circuit 39.

Each of the test signal transmitting circuit 31, the test signal receiving circuit 32, the bandwidth calculating circuit 33, the transmission signal determining circuit 34, the transmission signal generating circuit 35, the reception signal processing circuit 36, and the bandwidth information transmitting circuit 39 corresponds, for example, to a single circuit, a composite circuit, a programmed processor, a parallel programmed processor, an ASIC, an FPGA, or a combination thereof.

In FIG. 15, it is assumed that each of a test signal transmitting unit 11, a test signal receiving unit 14, the bandwidth calculating unit 15, the transmission signal determining unit 23, a transmission signal generating unit 17, a reception signal processing unit 18, and the bandwidth information receiving unit 22 which are components of the digital processing unit 10 in the optical transceiver 2-$n_a$ is implemented by dedicated hardware such as that shown in FIG. 16. Namely, it is assumed that the digital processing unit 10 is implemented by a test signal transmitting circuit 31, a test signal receiving circuit 32, a bandwidth calculating circuit 33, the transmission signal determining circuit 41, a transmission signal generating circuit 35, a reception signal processing circuit 36, and the bandwidth information receiving circuit 40.

Each of the test signal transmitting circuit 31, the test signal receiving circuit 32, the bandwidth calculating circuit 33, the transmission signal determining circuit 41, the transmission signal generating circuit 35, the reception signal processing circuit 36, and the bandwidth information receiving circuit 40 corresponds, for example, to a single circuit, a composite circuit, a programmed processor, a parallel programmed processor, an ASIC, an FPGA, or a combination thereof.

The components of the digital processing unit 10 are not limited to being implemented by dedicated hardware, and may be implemented by software, firmware, or a combination of software and firmware.

In a case where the components of the digital processing unit 10 in the optical transceiver 3-$n_b$ are implemented by software, firmware, or the like, a program for causing a computer to perform a processing procedure performed in each of the test signal transmitting unit 11, the test signal receiving unit 14, the bandwidth calculating unit 15, the transmission signal determining unit 16, the transmission signal generating unit 17, the reception signal processing unit 18, and the bandwidth information transmitting unit 21 is stored in the memory 61 shown in FIG. 4. Then, the processor 62 of the computer executes the program stored in the memory 61.

In a case where the components of the digital processing unit 10 in the optical transceiver 2-$n_a$ are implemented by software, firmware, or the like, a program for causing a computer to perform a processing procedure performed in each of the test signal transmitting unit 11, the test signal receiving unit 14, the bandwidth calculating unit 15, the transmission signal determining unit 23, the transmission signal generating unit 17, the reception signal processing unit 18, and the bandwidth information receiving unit 22 is stored in the memory 61 shown in FIG. 4. Then, the processor 62 of the computer executes the program stored in the memory 61.

Next, operations of the optical communication system according to the fourth embodiment will be described.

Here, for convenience of description, an example will be described in which an optical transceiver 3-1 sends bandwidth information to a transmission line 5 and an optical transceiver 2-1 receives the bandwidth information, by which a baud rate B of a transmission signal and entropy E of the transmission signal are determined.

The optical communication system according to the fourth embodiment is the same as the optical communication system according to the first embodiment except that the optical transceiver 2-1 includes the bandwidth information receiving unit 22 and the transmission signal determining unit 23, and the optical transceiver 3-1 includes the bandwidth information transmitting unit 21. Hence, here, operations of the bandwidth information transmitting unit 21, the bandwidth information receiving unit 22, and the transmission signal determining unit 23 will be mainly described.

As with the bandwidth calculating unit 15 shown in FIG. 2, the bandwidth calculating unit 15 in the optical transceiver 3-1 calculates a bandwidth $W_{L-H}$ of test signals.

The bandwidth calculating unit 15 outputs bandwidth information indicating the bandwidth $W_{L-H}$ of test signals to each of the transmission signal determining unit 16 and the bandwidth information transmitting unit 21.

When the bandwidth information transmitting unit 21 in the optical transceiver 3-1 receives the bandwidth information from the bandwidth calculating unit 15, the bandwidth information transmitting unit 21 transmits the bandwidth information to the optical transceiver 2-1 through the optical signal transmitting unit 12 or the like.

The bandwidth information transmitted from the optical transceiver 3-1 is transmitted as an optical signal to the optical transceiver 2-1. The bandwidth information may be a probabilistically shaped signal which is modulated by a PS technique or may be a signal modulated by a phase modulation scheme such as QPSK or multilevel QAM.

Here, the bandwidth information transmitting unit 21 transmits the bandwidth information to the optical transceiver 2-1 through the optical signal transmitting unit 12 or the like. However, this is merely an example, and the transmission signal generating unit 17 may include bandwidth information in an overhead portion at the start of a sequence of data in a generated transmission signal, and transmit the transmission signal including the bandwidth information to the optical transceiver 2-1 through the optical signal transmitting unit 12 or the like.

The optical receiver 13a in the optical signal receiving unit 13 in the optical transceiver 2-1 receives the bandwidth information which is the optical signal having been outputted to the multiplexer 4-2 from the optical signal transmitting unit 12 in the optical transceiver 3-1 and then having passed through the wavelength filters 6-2a and 6-1a.

When the bandwidth information is received by the optical receiver 13a, the optical-to-electrical converter 13b in the optical signal receiving unit 13 converts the bandwidth information from an optical signal to an electrical signal, and outputs the electrical signal to the bandwidth information receiving unit 22.

When the bandwidth information receiving unit 22 in the optical transceiver 2-1 receives the bandwidth information which is the electrical signal from the optical-to-electrical converter 13b in the optical signal receiving unit 13, the bandwidth information receiving unit 22 performs a reception process on the bandwidth information, thereby demodulating the bandwidth information, and outputs the demodulated bandwidth information to the transmission signal determining unit 23.

When the transmission signal determining unit 23 in the optical transceiver 2-1 receives the bandwidth information from the bandwidth information receiving unit 22, the transmission signal determining unit 23 determines a baud rate B of a transmission signal and entropy E of the transmission signal depending on the bandwidth $W_{L-H}$ indicated by the bandwidth information.

Here, the transmission signal determining unit 23 determines the entropy E of the transmission signal and the baud rate B of the transmission signal depending on the bandwidth $W_{L-H}$ indicated by the bandwidth information. However, this is merely an example, and when the optical transceiver 3-1 sends test signals to a transmission line 5 and the optical transceiver 2-1 receives the test signals, the transmission signal determining unit 23 determines a baud rate B of a transmission signal and entropy E of the transmission signal depending on a bandwidth $_{L-H}$ of the test signals which is calculated by the bandwidth calculating unit 15.

As with the transmission signal generating unit 17 shown in FIG. 2, the transmission signal generating unit 17 in the optical transceiver 2-1 generates a transmission signal having the entropy E and the baud rate B.

In the fourth embodiment described above, the second optical transceiver further includes the bandwidth information transmitting unit 21 that transmits bandwidth information indicating a bandwidth of test signals which is calculated by the bandwidth calculating unit 15. In addition, the first optical transceiver further includes the bandwidth information receiving unit 22 that receives the bandwidth information transmitted from the bandwidth information transmitting unit 21; and the transmission signal determining unit 23 that determines a modulation rate of a transmission signal and a modulation level of the transmission signal depending on the bandwidth indicated by the bandwidth information received by the bandwidth information receiving unit 22. Thus, in the first optical transceiver, even if a process of calculating a bandwidth by the bandwidth calculating unit 15 is omitted, the transmission signal determining unit 23 can determine a modulation rate of a transmission signal and a modulation level of the transmission signal.

Fifth Embodiment

A fifth embodiment describes optical transceivers $2\text{-}n_a$ and $3\text{-}n_b$ each including a first optical transceiver unit 71 and a second optical transceiver unit 72.

A configuration of an optical communication system according to the fifth embodiment is the same as the configuration of the optical communication system according to the first embodiment, and a configuration diagram showing the optical communication system according to the fifth embodiment is shown in FIG. 1.

Figure 17:
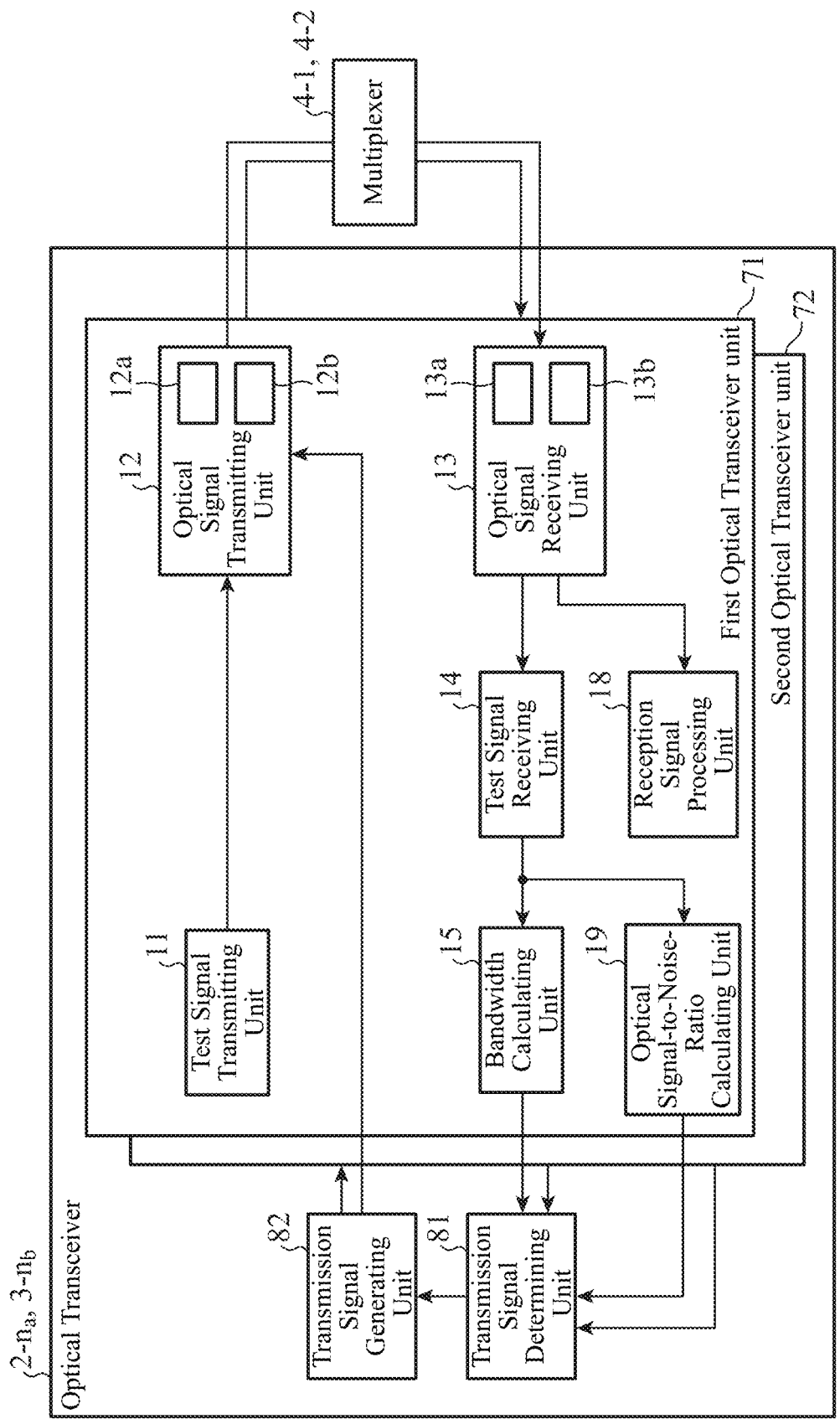
FIG. 17 is a configuration diagram showing optical transceivers 2-$n_a$ and 3-$n_b$ according to a fifth embodiment.

FIG. 17 is a configuration diagram showing optical transceivers $2\text{-}n_a$ and $3\text{-}n_b$ according to the fifth embodiment. In FIG. 17, the same reference signs as those of FIGS. 2 and 9 indicate the same or corresponding portions and thus description thereof is omitted.

A hardware configuration diagram showing a part of hardware of the optical transceivers $2\text{-}n_a$ and $3\text{-}n_b$ shown in FIG. 17 is shown in FIG. 10.

The first optical transceiver unit 71 includes a test signal transmitting unit 11, an optical signal transmitting unit 12, an optical signal receiving unit 13, a test signal receiving unit 14, a bandwidth calculating unit 15, a reception signal processing unit 18, and an optical signal-to-noise-ratio calculating unit 19.

The second optical transceiver unit 72 includes a test signal transmitting unit 11, an optical signal transmitting unit 12, an optical signal receiving unit 13, a test signal receiving unit 14, a bandwidth calculating unit 15, a reception signal processing unit 18, and an optical signal-to-noise-ratio calculating unit 19.

In the optical transceivers $2\text{-}n_a$ and $3\text{-}n_b$ shown in FIG. 17, both of the first optical transceiver unit 71 and the second optical transceiver unit 72 include the test signal receiving unit 14, the bandwidth calculating unit 15, and the optical signal-to-noise-ratio calculating unit 19. However, this is merely an example, and it is sufficient that at least either one of the first optical transceiver unit 71 and the second optical transceiver unit 72 calculate a bandwidth $W_{L-H}$ of test signals, and thus, for example, the test signal receiving unit 14, the bandwidth calculating unit 15, and the optical signal-to-noise-ratio calculating unit 19 which are included in the second optical transceiver unit 72 may be removed.

Namely, the first optical transceiver unit 71 and the second optical transceiver unit 72 are included in the same optical transceiver $2\text{-}n_a$ (or $3\text{-}n_b$). Hence, a propagation path for test signals from the optical signal transmitting unit 12 in the first optical transceiver unit 71 to the optical signal receiving unit 13 in the first optical transceiver unit 71 is identical to a propagation path for test signals from the optical signal transmitting unit 12 in the second optical transceiver unit 72 to the optical signal receiving unit 13 in the second optical transceiver unit 72.

Thus, a bandwidth $W_{L-H}$ of test signals calculated by the bandwidth calculating unit 15 in the first optical transceiver unit 71 is identical to a bandwidth $W_{L-H}$ of test signals calculated by the bandwidth calculating unit 15 in the second optical transceiver unit 72. Hence, for example, the test signal receiving unit 14, the bandwidth calculating unit 15, and the optical signal-to-noise-ratio calculating unit 19 which are included in the second optical transceiver unit 72 may be removed.

A transmission signal determining unit 81 may be implemented by, for example, the transmission signal determining circuit 38 shown in FIG. 10.

The transmission signal determining unit 81 obtains a bandwidth $W_{L-H}$ of test signals from the bandwidth calculating unit 15 in the first optical transceiver unit 71 or the bandwidth calculating unit 15 in the second optical transceiver unit 72.

The transmission signal determining unit 81 obtains an OSNR of the test signals from the optical signal-to-noise-ratio calculating unit 19 in the first optical transceiver unit 71 or the optical signal-to-noise-ratio calculating unit 19 in the second optical transceiver unit 72.

The transmission signal determining unit 81 determines baud rates $B_1$ and $B_2$ which are modulation rates of two transmission signals $S_1$ and $S_2$ and entropies $E_1$ and $E_2$ which are modulation levels of the two transmission signals $S_1$ and $S_2$, depending on each of the bandwidth $W_{L-H}$ of the test signals and the OSNR of the test signals.

A transmission signal generating unit 82 is implemented by, for example, the transmission signal generating circuit 35 shown in FIG. 10.

The transmission signal generating unit 82 obtains the entropies $E_1$ and $E_2$ of the respective two transmission signals $S_1$ and $S_2$ and the baud rates $B_1$ and $B_2$ of the respective two transmission signals $S_1$ and $S_2$ which are determined by the transmission signal determining unit 81.

The transmission signal generating unit 82 generates the transmission signal $S_1$ having the entropy $E_1$ which is one of the entropies $E_1$ and $E_2$ and having the baud rate $B_1$ which is one of the baud rates $B_1$ and $B_2$.

The transmission signal generating unit 82 generates the transmission signal $S_2$ having the entropy $E_2$ which is the other one of the entropies $E_1$ and $E_2$ and having the baud rate $B_2$ which is the other one of the baud rates $B_1$ and $B_2$.

The transmission signal generating unit 82 outputs the transmission signal $S_1$ to the optical signal transmitting unit 12 in the first optical transceiver unit 71, and outputs the transmission signal $S_2$ to the optical signal transmitting unit 12 in the second optical transceiver unit 72.

In FIG. 17, it is assumed that each of the test signal transmitting unit 11, the test signal receiving unit 14, the bandwidth calculating unit 15, the reception signal processing unit 18, the optical signal-to-noise-ratio calculating unit 19, the transmission signal determining unit 81, and the transmission signal generating unit 82 which are some of the components of the optical transceivers $2\text{-}n_a$ and $3\text{-}n_b$ is implemented by dedicated hardware such as that shown in FIG. 10. Namely, it is assumed that a part of the optical transceivers $2\text{-}n_a$ and $3\text{-}n_b$ is implemented by the test signal transmitting circuit 31, the test signal receiving circuit 32, the bandwidth calculating circuit 33, the reception signal processing circuit 36, the optical signal-to-noise-ratio calculating circuit 37, the transmission signal determining circuit 38, and the transmission signal generating circuit 35.

Each of the test signal transmitting circuit 31, the test signal receiving circuit 32, the bandwidth calculating circuit 33, the reception signal processing circuit 36, the optical signal-to-noise-ratio calculating circuit 37, the transmission signal determining circuit 38, and the transmission signal generating circuit 35 corresponds, for example, to a single circuit, a composite circuit, a programmed processor, a parallel programmed processor, an ASIC, an FPGA, or a combination thereof.

Some of the components of the optical transceivers $2\text{-}n_a$ and $3\text{-}n_b$ are not limited to being implemented by dedicated hardware, and may be implemented by software, firmware, or a combination of software and firmware.

When some of the components of the optical transceivers $2\text{-}n_a$ and $3\text{-}n_b$ are implemented by software, firmware, or the like, a program for causing a computer to perform a processing procedure performed in each of the test signal transmitting unit 11, the test signal receiving unit 14, the bandwidth calculating unit 15, the reception signal processing unit 18, the optical signal-to-noise-ratio calculating unit 19, the transmission signal determining unit 81, and the transmission signal generating unit 82 is stored in the memory 61 shown in FIG. 4. Then, the processor 62 of the computer executes the program stored in the memory 61.

Next, operations of the optical communication system according to the fifth embodiment will be described.

Figure 18:
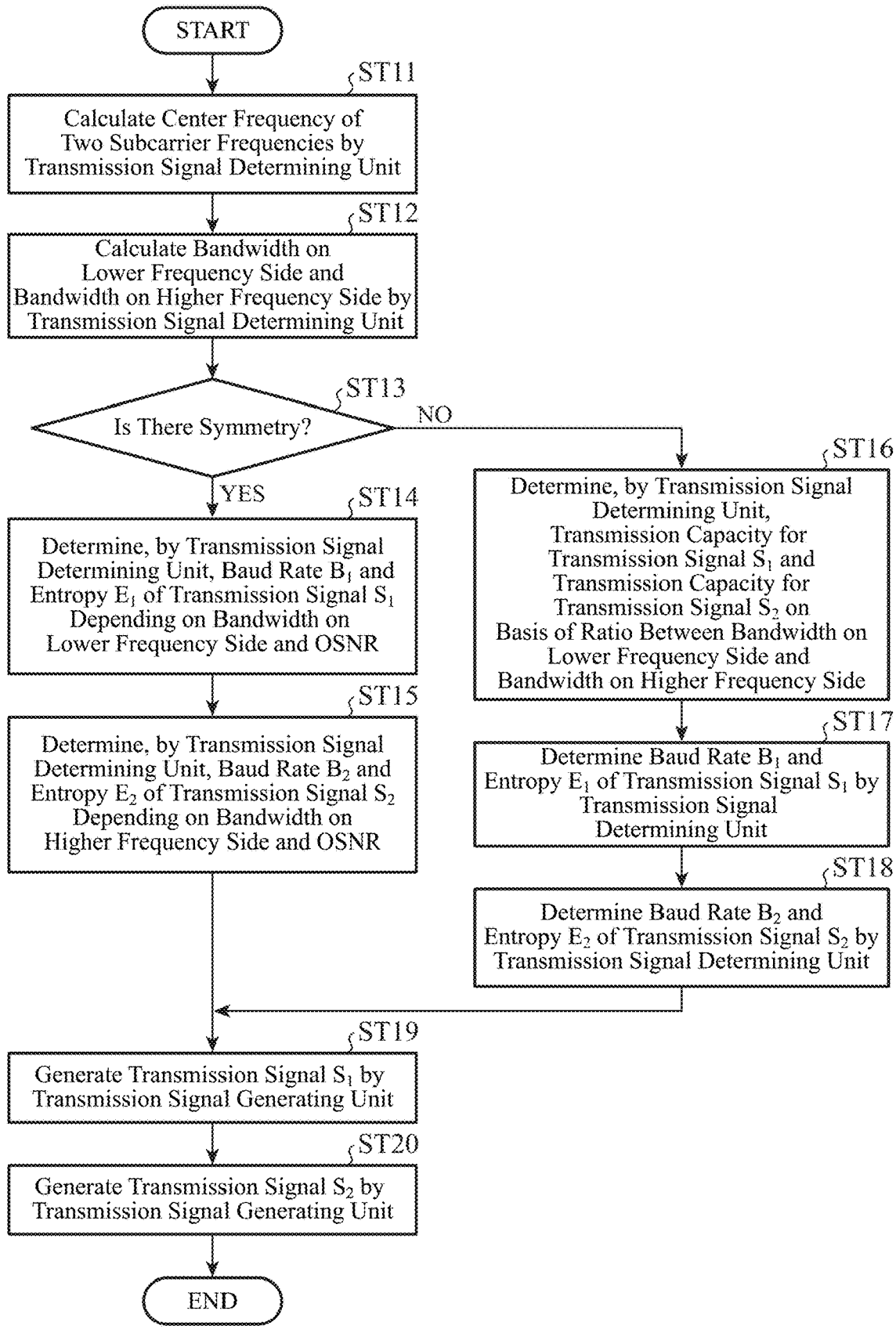
FIG. 18 is a flowchart showing processing procedures performed by a transmission signal determining unit 81 and a transmission signal generating unit 82 in the optical transceivers 2-$n_a$ and 3-$n_b$ according to the fifth embodiment.

FIG. 18 is a flowchart showing processing procedures performed by the transmission signal determining unit 81 and the transmission signal generating unit 82 in the optical transceivers $2\text{-}n_a$ and $3\text{-}n_b$ according to the fifth embodiment.

As with the bandwidth calculating units 15 shown in FIGS. 2 and 9, the bandwidth calculating unit 15 in the first optical transceiver unit 71 or the bandwidth calculating unit 15 in the second optical transceiver unit 72 calculates a bandwidth $W_{L\text{-}H}$ of test signals.

The bandwidth calculating unit 15 in the first optical transceiver unit 71 or the bandwidth calculating unit 15 in the second optical transceiver unit 72 outputs the bandwidth $W_{L\text{-}H}$ of test signals to the transmission signal determining unit 81.

As with the optical signal-to-noise-ratio calculating unit 19 shown in FIG. 9, the optical signal-to-noise-ratio calculating unit 19 in the first optical transceiver unit 71 or the optical signal-to-noise-ratio calculating unit 19 in the second optical transceiver unit 72 calculates an OSNR of the test signals.

The optical signal-to-noise-ratio calculating unit 19 in the first optical transceiver unit 71 or the optical signal-to-noise-ratio calculating unit 19 in the second optical transceiver unit 72 outputs the OSNR of the test signals to the transmission signal determining unit 81.

The transmission signal determining unit 81 obtains the bandwidth $W_{L\text{-}H}$ of the test signals from the bandwidth calculating unit 15 in the first optical transceiver unit 71 or the bandwidth calculating unit 15 in the second optical transceiver unit 72.

The transmission signal determining unit 81 obtains the OSNR of the test signals from the optical signal-to-noise-ratio calculating unit 19 in the first optical transceiver unit 71 or the optical signal-to-noise-ratio calculating unit 19 in the second optical transceiver unit 72.

The transmission signal determining unit 81 calculates, from subcarrier frequencies $f_{sc1}$ and $f_{sc2}$ of transmission signals $S_1$ and $S_2$ which are to be generated by the transmission signal generating unit 82, a center frequency $f_m$ of the two subcarrier frequencies $f_{sc1}$ and $f_{sc2}$ as shown in the following equation (1) (step ST11 of FIG. 18):

$$f_m=(f_{sc1}+f_{sc2})/2 \qquad (1)$$

The subcarrier frequencies $f_{sc1}$ and $f_{sc2}$ of the transmission signals $S_1$ and $S_2$ may be stored in an internal memory of the transmission signal determining unit 81 or may be provided from a source external to the transmission signal determining unit 81.

The transmission signal determining unit 81 calculates a bandwidth $W_1$ on a lower frequency side than the center frequency $f_m$ and a bandwidth $W_2$ on a higher frequency side than the center frequency $f_m$ in the bandwidth $W_{L\text{-}H}$ of the test signals (step ST12 of FIG. 18).

The lowest frequency in the bandwidth $W_1$ on the lower frequency side is a frequency obtained by subtracting a difference between the center frequency $f_m$ and the subcarrier frequency $f_{sc1}$ from the subcarrier frequency $f_{sc1}$. The highest frequency in the bandwidth $W_1$ on the lower frequency side is the center frequency $f_m$.

The lowest frequency in the bandwidth $W_2$ on the higher frequency side is the center frequency $f_m$. The highest frequency in the bandwidth $W_2$ on the higher frequency side is a frequency obtained by adding a difference between the center frequency $f_m$ and the subcarrier frequency $f_{sc2}$ to the subcarrier frequency $f_{sc2}$.

The transmission signal determining unit 81 calculates a bandwidth difference $\Delta W$ between the bandwidth $W_1$ on the lower frequency side and the bandwidth $W_2$ on the higher frequency side as shown in the following equation (2):

$$\Delta W=|W_1-W_2| \qquad (2)$$

The transmission signal determining unit 81 determines symmetry between the bandwidth $W_1$ on the lower frequency side and the bandwidth $W_2$ on the higher frequency side by comparing the bandwidth difference $\Delta W$ with a threshold value Th.

Namely, the transmission signal determining unit 81 determines that when the bandwidth difference $\Delta W$ is smaller than the threshold value Th, there is symmetry, and determines that when the bandwidth difference $\Delta W$ is equal to or greater than the threshold value Th, there is no symmetry.

The threshold value Th may be stored in the internal memory of the transmission signal determining unit 81 or may be provided from a source external to the transmission signal determining unit 81. For the threshold value Th, a value on the order of 10% of the bandwidth $W_{L\text{-}H}$ of the test signals may be set.

If the transmission signal determining unit 81 determines that there is symmetry (if YES at step ST13 of FIG. 18), then the transmission signal determining unit 81 determines a baud rate $B_1$ of the transmission signal $S_1$ and entropy $E_1$ of the transmission signal $S_1$ depending on the bandwidth $W_1$ on the lower frequency side and the OSNR of the test signals (step ST14 of FIG. 18).

In addition, the transmission signal determining unit 81 determines a baud rate $B_2$ of the transmission signal $S_2$ and entropy $E_2$ of the transmission signal $S_2$ depending on the bandwidth $W_2$ on the higher frequency side and the OSNR of the test signals (step ST15 of FIG. 18).

A process itself of determining the baud rates $B_1$ and $B_2$ by the transmission signal determining unit 81 is the same as the process of determining the baud rate B by the transmission signal determining unit 20 shown in FIG. 9. In addition, a process itself of determining the entropies $E_1$ and $E_2$ by the transmission signal determining unit 81 is the same as the process of determining the entropy E by the transmission signal determining unit 20 shown in FIG. 9.

Hence, though a detailed description is omitted, when the transmission signal determining unit 81 determines that there is symmetry, the transmission signal determining unit 81 determines each of the baud rate $B_1$ and entropy $E_1$ of the transmission signal $S_1$ depending on the bandwidth $W_1$ on the lower frequency side, and determines each of the baud rate $B_2$ and entropy $E_2$ of the transmission signal $S_2$ depending on the bandwidth $W_2$ on the higher frequency side. Then, when the OSNR calculated by the optical signal-to-noise-ratio calculating unit 19 is lower than $OSNR_0$ which is an error correction limit, the transmission signal determining unit 81 changes each of the determined baud rate $B_1$ and entropy $E_1$ and changes each of the determined baud rate $B_2$ and entropy $E_2$.

By changing each of the baud rates $B_1$ and $B_2$ and the entropies $E_1$ and $E_2$ by the transmission signal determining unit 81, the bandwidth $W_1$ on the lower frequency side changes to a bandwidth $W_{1'}$ in which the OSNR calculated by the optical signal-to-noise-ratio calculating unit 19 is equal to or greater than $OSNR_0$ which is an error correction limit. In addition, the bandwidth $W_2$ on the higher frequency side changes to a bandwidth $W_{2'}$ in which the OSNR calculated by the optical signal-to-noise-ratio calculating unit 19 is equal to or greater than $OSNR_0$ which is an error correction limit.

Figure 19:
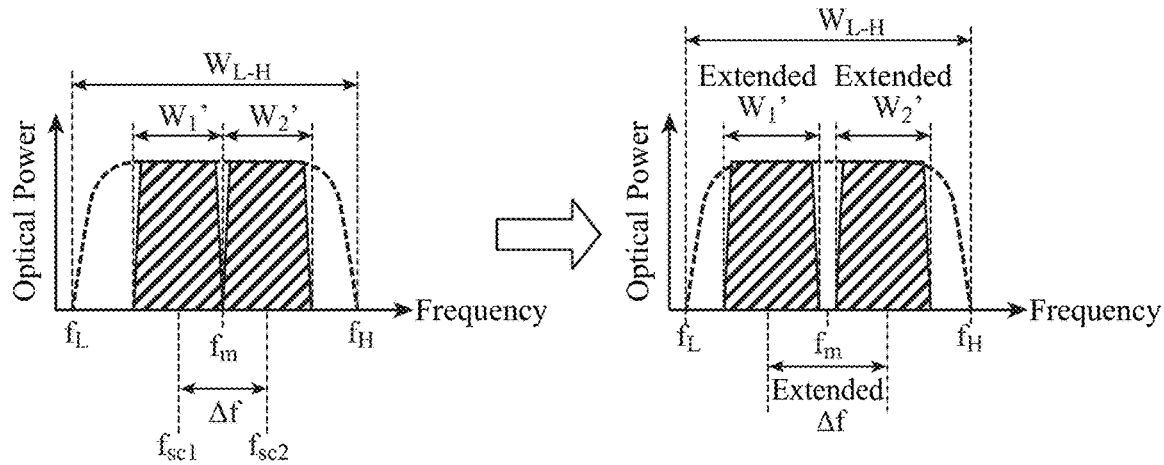
FIG. 19 is an explanatory diagram showing an exemplary change in subcarrier spacing $\Delta f$ in a case where the sum of a bandwidth $W_{1'}$ and a bandwidth $W_{2'}$ is smaller than a bandwidth $W_{L-H}$ of test signals.

FIG. 19 is an explanatory diagram showing an exemplary change in subcarrier spacing $\Delta f$ in a case where the sum of a bandwidth $W_{1'}$ and a bandwidth $W_{2'}$ is smaller than a bandwidth $W_{L-H}$ of test signals.

Figure 20:
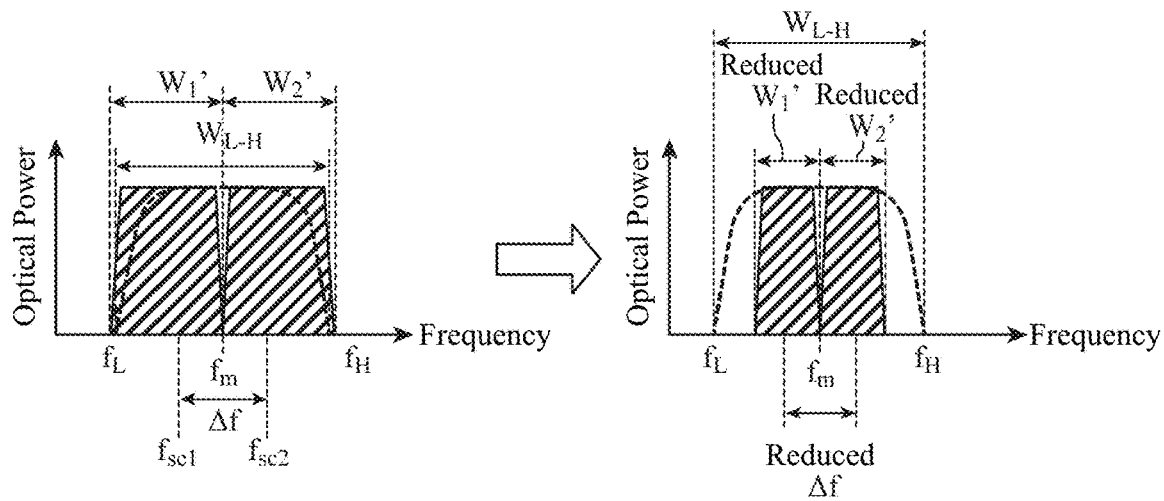
FIG. 20 is an explanatory diagram showing an exemplary change in subcarrier spacing $\Delta f$ in a case where the sum of the bandwidth $W_{1'}$ and the bandwidth $W_{2'}$ is equal to or greater than the bandwidth $W_{L-H}$ of test signals.

FIG. 20 is an explanatory diagram showing an exemplary change in subcarrier spacing $\Delta f$ in a case where the sum of the bandwidth $W_{1'}$ and the bandwidth $W_{2'}$ is equal to or greater than the bandwidth $W_{L-H}$ of test signals.

In FIGS. 19 and 20, the horizontal axis is frequency and the vertical axis is optical power of transmission signals $S_1$ and $S_2$.

An initial value of the subcarrier spacing $\Delta f$ between the transmission signal $S_1$ and the transmission signal $S_2$ is an absolute value of a difference between a subcarrier frequency $f_{sc1}$ of the transmission signal $S_1$ and a subcarrier frequency $f_{sc2}$ of the transmission signal $S_2$.

As shown in FIG. 19, when the sum of the bandwidth $W_{1'}$ and the bandwidth $W_{2'}$ is smaller than the bandwidth $W_{L-H}$ of test signals, the bandwidth $W_{L-H}$ is in a state in which there is an allowance for signal transmission. In order to achieve an effective use of the bandwidth $W_{L-H}$, the transmission signal determining unit 81 increases the baud rates $B_1$ and $B_2$ of the transmission signals $S_1$ and $S_2$, thereby extending each of the bandwidth $W_{1'}$ and the bandwidth $W_{2'}$ in such a manner that each of the bandwidth $W_{1'}$ and the bandwidth $W_{2'}$ does not exceed one half of the bandwidth $W_{L-H}$. To avoid overlapping of the extended bandwidth $W_{1'}$ and the extended bandwidth $W_{2'}$, the transmission signal determining unit 81 extends the subcarrier spacing $\Delta f$ by, for example, 1.2 times of the bandwidth $W_{1'}$ or 1.2 times of the bandwidth $W_{2'}$.

As shown in FIG. 20, when the sum of the bandwidth $W_{1'}$ and the bandwidth $W_{2'}$ is equal to or greater than the bandwidth $W_{L-H}$ of test signals, it is a state in which a part of transmission signals $S_1$ and $S_2$ may not be able to be transmitted. In order that all of the transmission signals $S_1$ and $S_2$ can be transmitted, the transmission signal determining unit 81 reduces each of the bandwidth $W_{1'}$ and the bandwidth $W_{2'}$ by reducing the baud rates $B_1$ and $B_2$ of the transmission signals $S_1$ and $S_2$ so that each of the bandwidth $W_{1'}$ and the bandwidth $W_{2'}$ is narrower than one half of the bandwidth $W_{L-H}$. The transmission signal determining unit 81 reduces the subcarrier spacing $\Delta f$ in such a manner that the reduced bandwidth $W_{1'}$ and the reduced bandwidth $W_{2'}$ do not overlap each other.

If the transmission signal determining unit 81 determines that there is no symmetry (if NO at step ST13 of FIG. 18), then the transmission signal determining unit 81 determines a transmission capacity for the transmission signal $S_1$ and a transmission capacity for the transmission signal $S_2$, on the basis of a ratio between the bandwidth $W_1$ on the lower frequency side and the bandwidth $W_2$ on the higher frequency side (step ST16 of FIG. 18).

Figure 21:
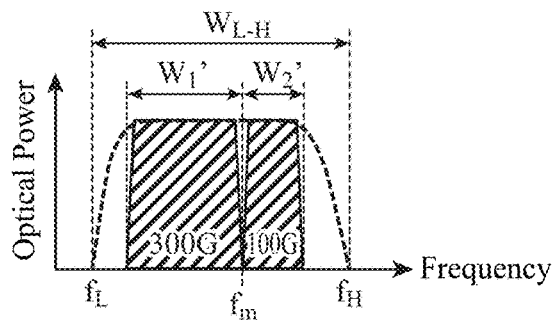
FIG. 21 is an explanatory diagram showing an example in which the transmission signal determining unit 81 determines a transmission capacity for a transmission signal $S_1$ and a transmission capacity for a transmission signal $S_2$ on the basis of a ratio between a bandwidth $W_1$ on a lower frequency side and a bandwidth $W_2$ on a higher frequency side.

FIG. 21 is an explanatory diagram showing an example in which the transmission signal determining unit 81 determines a transmission capacity for a transmission signal $S_1$ and a transmission capacity for a transmission signal $S_2$, on the basis of a ratio between a bandwidth $W_1$ on the lower frequency side and a bandwidth $W_2$ on the higher frequency side.

In FIG. 21, the horizontal axis is frequency and the vertical axis is optical power of the transmission signals $S_1$ and $S_2$.

FIG. 21 shows exemplary determination of transmission capacities in a case where the entire transmission capacity is 400 [Gbit/sec].

In FIG. 21, since the ratio between the bandwidth $W_1$ on the lower frequency side and the bandwidth $W_2$ on the higher frequency side is 3:1, the transmission capacity for the transmission signal $S_1$ is determined to be 300 [Gbit/sec] and the transmission capacity for the transmission signal $S_2$ is determined to be 100 [Gbit/sec].

FIG. 21 shows an example in which the entire transmission capacity is 400 [Gbit/sec] and the ratio between the bandwidth $W_1$ on the lower frequency side and the bandwidth $W_2$ on the higher frequency side is 3:1. However, this is merely an example. For example, when the entire transmission capacity is 700 [Gbit/sec] and the ratio between the bandwidth $W_1$ on the lower frequency side and the bandwidth $W_2$ on the higher frequency side is 5:2, the transmission capacity for the transmission signal $S_1$ is determined to be 500 [Gbit/sec] and the transmission capacity for the transmission signal $S_2$ is determined to be 200 [Gbit/sec].

A relationship between the baud rate of a transmission signal and the entropy of the transmission signal in a case where the transmission capacity for the transmission signal is constant is as shown in, for example, FIG. 5.

In the internal memory of the transmission signal determining unit 81 there is stored, for each of different transmission capacities, a table showing a relationship between the baud rate of a transmission signal and the entropy of the transmission signal.

The transmission signal determining unit 81 determines a baud rate $B_1$ of the transmission signal $S_1$ and entropy $E_1$ of the transmission signal $S_1$ by referring to a table corresponding to the determined transmission capacity for the transmission signal $S_1$ (step ST17 of FIG. 18). There are a plurality of combinations of the baud rate $B_1$ and the entropy $E_1$, but any combination may be used.

The transmission signal determining unit 81 determines a baud rate $B_2$ of the transmission signal $S_2$ and entropy $E_2$ of the transmission signal $S_2$ by referring to a table corresponding to the determined transmission capacity for the transmission signal $S_2$ (step ST18 of FIG. 18). There are a plurality of combinations of the baud rate $B_2$ and the entropy $E_2$, but any combination may be used.

The transmission signal generating unit 82 generates the transmission signal $S_1$ having the entropy $E_1$ determined by the transmission signal determining unit 81 and having the baud rate $B_1$ determined by the transmission signal determining unit 81 (step ST19 of FIG. 18).

The transmission signal generating unit 82 generates the transmission signal $S_2$ having the entropy $E_2$ determined by the transmission signal determining unit 81 and having the baud rate $B_2$ determined by the transmission signal determining unit 81 (step ST20 of FIG. 18).

The transmission signal generating unit 82 outputs the transmission signal $S_1$ to the optical signal transmitting unit 12 in the first optical transceiver unit 71, and outputs the transmission signal $S_2$ to the optical signal transmitting unit 12 in the second optical transceiver unit 72.

In the fifth embodiment described above, the optical transceivers 2-$n_a$ and 3-$n_b$ are configured in such a manner that the transmission signal determining unit 81 determines modulation rates of respective two transmission signals, modulation levels of the respective two transmission signals, and subcarrier spacing between the two transmission signals, depending on each of a bandwidth calculated by the bandwidth calculating unit 15 and an optical signal-to-noise-ratio calculated by the optical signal-to-noise-ratio calculating unit 19. Thus, even when the optical transceivers 2-$n_a$ and 3-$n_b$ each generate two transmission signals, the optical transceivers 2-$n_a$ and 3-$n_b$ can increase the transmission capacity of an optical communication network over one that calculates a bandwidth of an optical signal having passed through all wavelength filters through which the optical signal passes, on the basis of the number of the wavelength filters through which the optical signal passes.

Note that in the present disclosure, a free combination of the embodiments, modifications to any component of each of the embodiments, or omissions of any component in each of the embodiments are possible.

INDUSTRIAL APPLICABILITY

The present disclosure is suitable for an optical transceiver, a transmission signal determination method, and an optical communication system including optical transceivers.

REFERENCE SIGNS LIST

1, 1-1, 1-2: optical transmission apparatus, 2, 2-1 to 2-$N_a$: optical transceiver (first optical transceiver), 3, 3-1 to 3-$N_b$: optical transceiver (second optical transceiver), 4, 4-1, 4-2: multiplexer, 5: transmission line, 6-1, 6-2: optical splitter, 6-1$a$, 6-2$a$: wavelength filter, 10: digital processing unit, 11: test signal transmitting unit, 12: optical signal transmitting unit, 12$a$: electrical-to-optical converter, 12$b$: optical transmitter, 13: optical signal receiving unit, 13$a$: optical receiver, 13$b$: optical-to-electrical converter, 14: test signal receiving unit, 15: bandwidth calculating unit, 16: transmission signal determining unit, 17: transmission signal generating unit, 18: reception signal processing unit, 19: optical signal-to-noise-ratio calculating unit, 20: transmission signal determining unit, 21: bandwidth information transmitting unit, 22: bandwidth information receiving unit, 23: transmission signal determining unit, 31: test signal transmitting circuit, 32: test signal receiving circuit, 33: bandwidth calculating circuit, 34: transmission signal determining circuit, 35: transmission signal generating circuit, 36: reception signal processing circuit, 37: optical signal-to-noise-ratio calculating circuit, 38: transmission signal determining circuit, 39: bandwidth information transmitting circuit, 40: bandwidth information receiving circuit, 41: transmission signal determining circuit, 51: test signal transmitting unit, 52: light source, 53: optical modulator, 54: control circuit, 61: memory, 62: processor, 71: first optical transceiver unit, 72: second optical transceiver unit, 81: transmission signal determining unit, 82: transmission signal generating unit

The invention claimed is:

1. An optical transceiver comprising processing circuitry to calculate, when test signals are sent to a transmission line of an optical communication network from a test signal transmitter and a test signal receiver receives the test signals having passed through a wavelength filter, a bandwidth of the test signals received by the test signal receiver, the test signal transmitter generating, as the test signals, a collection of narrowband signals, the narrowband signals being a plurality of signals having a narrower bandwidth than a bandwidth of the wavelength filter and having different frequencies, and the wavelength filter being included in an optical splitter inserted in the transmission line, and the collection of narrowband signals including a narrowband signal having a higher frequency than a highest frequency in the bandwidth of the wavelength filter and a narrowband signal having a lower frequency than a lowest frequency in the bandwidth of the wavelength filter, and to perform determination of a modulation rate of a transmission signal and a modulation level of the transmission signal depending on the bandwidth.

2. The optical transceiver according to claim 1, wherein in the determination of the modulation rate and the modulation level, the processing circuitry determines the bandwidth to be a bandwidth of the transmission signal, determines the modulation rate of the transmission signal from the bandwidth of the transmission signal, and determines the modulation level of the transmission signal from the modulation rate.

3. The optical transceiver according to claim 1, wherein the processing circuitry performs calculation of an optical signal-to-noise ratio of the test signals received by the test signal receiver, wherein in the determination of the modulation rate and the modulation level, the modulation rate of the transmission signal and the modulation level of the transmission signal are determined depending on each of the bandwidth and the optical signal-to-noise ratio.

4. The optical transceiver according to claim 3, wherein when the optical signal-to-noise ratio is lower than an optical signal-to-noise ratio that is an error correction limit, in the determination of the modulation rate and the modulation level, the processing circuitry determines the modulation rate of the transmission signal and the modulation level of the transmission signal depending on a bandwidth in which the optical signal-to-noise ratio calculated in the calculation is the optical signal-to-noise ratio that is the error correction limit.

5. The optical transceiver according to claim 1, wherein the test signal transmitter includes:
   a light source to output continuous light having a narrower bandwidth than the bandwidth of the wavelength filter;
   an optical modulator to generate the narrowband signals by performing pulse modulation on the continuous light outputted from the light source, and send the narrowband signals to the transmission line; and
   a control circuit to switch a frequency of the continuous light outputted from the light source.

6. The optical transceiver according to claim 1, wherein the processing circuitry generates a transmission signal having the modulation level determined in the determination of the modulation level and having the modulation rate determined in the determination of the modulation rate.

7. The optical transceiver according to claim 1, wherein the processing circuitry functions as:
   a first optical transceiver unit to transmit a first transmission signal; and
   a second optical transceiver unit to transmit a second transmission signal,
   wherein as at least one of the first optical transceiver unit and the second optical transceiver unit, the processing circuitry calculates the bandwidth, and
   calculates an optical signal-to-noise ratio of the test signals received by the test signal receiver, wherein
   the processing circuitry determines modulation rates of respective two transmission signals being the first transmission signal and the second transmission signal, modulation levels of the respective two transmission signals, and subcarrier spacing between the two transmission signals, depending on each of the bandwidth and the optical signal-to-noise ratio.

8. The optical transceiver according to claim 7, wherein the processing circuitry generates, as the first transmission signal, a transmission signal having one of the modulation levels of the respective two transmission signals and having one of the modulation rates of the respective two transmission signals, and generates, as the second transmission signal, a transmission signal having another one of the modulation levels of the respective two transmission signals and having another one of the modulation rates of the respective two transmission signals.

9. The optical transceiver according to claim 7, wherein the processing circuitry
   calculates, from subcarrier frequencies of the respective two transmission signals, a center frequency of the two subcarrier frequencies, and calculates a bandwidth on a lower frequency side than the center frequency and a bandwidth on a higher frequency side than the center frequency in the bandwidth,
   determines each of the modulation rate of one of the two transmission signals and the modulation level of the one transmission signal depending on each of the bandwidth on the lower frequency side and the optical signal-to-noise ratio,
   determines each of the modulation rate of another one of the two transmission signals and the modulation level of the other transmission signal depending on each of the bandwidth on the higher frequency side and the optical signal-to-noise ratio, and
   determines the subcarrier spacing from the bandwidth on the lower frequency side and the bandwidth on the higher frequency side.

10. A transmission signal determination method comprising:
    calculating, when test signals are sent to a transmission line of an optical communication network from a test signal transmitter and a test signal receiver receives the test signals having passed through a wavelength filter, a bandwidth of the test signals received by the test signal receiver, the test signal transmitter generating, as the test signals, a collection of narrowband signals, the narrowband signals being a plurality of signals having a narrower bandwidth than a bandwidth of the wavelength filter and having different frequencies, and the wavelength filter being included in an optical splitter inserted in the transmission line, and the collection of narrowband signals including a narrowband signal having a higher frequency than a highest frequency in the bandwidth of the wavelength filter and a narrowband signal having a lower frequency than a lowest frequency in the bandwidth of the wavelength filter; and
    performing determination of a modulation rate of a transmission signal and a modulation level of the transmission signal depending on the bandwidth.

11. An optical communication system comprising:
    a first optical transceiver including processing circuitry to generate, as test signals, a collection of narrowband signals and send the test signals to a transmission line of an optical communication network, the narrowband signals being a plurality of signals having a narrower bandwidth than a bandwidth of a wavelength filter and having different frequencies, and the wavelength filter being included in an optical splitter inserted in the transmission line, and the collection of narrowband signals including a narrowband signal having a higher frequency than a highest frequency in the bandwidth of the wavelength filter and a narrowband signal having a lower frequency than a lowest frequency in the bandwidth of the wavelength filter; and
    a second optical transceiver including processing circuitry to receive the test signals having been sent from the test signal transmitter and then having passed through the wavelength filter, to calculate a bandwidth of the test signals received by the test signal receiver; and to perform determination of a modulation rate of a transmission signal and a modulation level of the transmission signal depending on the bandwidth.

12. The optical communication system according to claim 11, wherein the processing circuitry of the second optical transceiver transmits bandwidth information indicating the bandwidth, and
    the processing circuitry of the first optical transceiver receives the bandwidth information, and
    determines the modulation rate of the transmission signal and the modulation level of the transmission signal depending on the bandwidth indicated by the bandwidth information.

13. The optical communication system according to claim 11, wherein the processing circuitry of the second optical transceiver functions as:
    a first optical transceiver unit to transmit a first transmission signal; and
    a second optical transceiver unit to transmit a second transmission signal, wherein as at least one of the first optical transceiver unit and the second optical transceiver unit, the processing circuitry calculates the bandwidth, and
calculates an optical signal-to-noise ratio of the test signals received by the test signal receiver, wherein
the processing circuitry of the second optical transceiver determines modulation rates of respective two transmission signals being the first transmission signal and the second transmission signal, modulation levels of the respective two transmission signals, and subcarrier spacing between the two transmission signals, depending on each of the bandwidth and the optical signal-to-noise ratio.

* * * * *